(12) United States Patent
Bango et al.

(10) Patent No.: US 11,752,441 B1
(45) Date of Patent: Sep. 12, 2023

(54) TOY ACTION FIGURE WITH REMOTE AND LOCAL POWER, PLAY, IDENTIFICATION, AND SELECTIVE ACTIVATION

(71) Applicants: Joseph J. Bango, New Haven, CT (US); Michael Dziekan, Bethany, CT (US)

(72) Inventors: Joseph J. Bango, New Haven, CT (US); Michael Dziekan, Bethany, CT (US)

( * ) Notice: Subject to any disclaimer, the term of this patent is extended or adjusted under 35 U.S.C. 154(b) by 85 days.

(21) Appl. No.: 17/192,023

(22) Filed: Mar. 4, 2021

Related U.S. Application Data

(60) Provisional application No. 62/991,372, filed on Mar. 18, 2020.

(51) Int. Cl.
| | |
|---|---|
| *A63H 3/38* | (2006.01) |
| *A63H 33/26* | (2006.01) |
| *A63H 3/36* | (2006.01) |
| *A63H 3/00* | (2006.01) |
| *A63H 3/52* | (2022.01) |
| *A63F 13/65* | (2014.01) |

(52) U.S. Cl.
CPC ............. *A63H 3/365* (2013.01); *A63H 3/006* (2013.01); *A63H 3/52* (2013.01); *A63F 13/65* (2014.09); *A63F 2300/69* (2013.01); *A63H 2200/00* (2013.01)

(58) Field of Classification Search
CPC .......... A63H 3/006; A63H 3/365; A63H 3/38; A63H 33/26
See application file for complete search history.

(56) References Cited

U.S. PATENT DOCUMENTS

| | | | | |
|---|---|---|---|---|
| 8,647,167 | B2 * | 2/2014 | Heilbron | A63H 13/005 446/337 |
| 10,350,505 | B2 * | 7/2019 | Chan | A63H 3/006 |
| 10,497,324 | B2 * | 12/2019 | Heilbron | A63H 3/365 |
| 10,661,191 | B1 * | 5/2020 | Reeves | A63H 11/10 |
| 2008/0057824 | A1 * | 3/2008 | Gupta | A63H 3/006 446/219 |

* cited by examiner

*Primary Examiner* — John A Ricci
(74) *Attorney, Agent, or Firm* — Michael A. Blake

(57) ABSTRACT

A toy figure with a changeable face comprising: a head; a facial area located on the head; a torso attached to the head; a pair of arms attached to the torso; a pair of legs attached to the torso; changeable markings located on the facial area, the changeable markings will change when the changeable markings receive a stimuli. A toy figure backpack comprising: a container, the container comprising a front side configured to abut against a toy figure, and a rear side; attachment means located on the container, and configured to removeably attach to the toy figure; a pair of electrically conductive contacts located on the front side; a pc board in communication with the pair of electrically conductive contacts, the pc board located within the container; a power supply located within the container and in communication with the pc board.

15 Claims, 18 Drawing Sheets

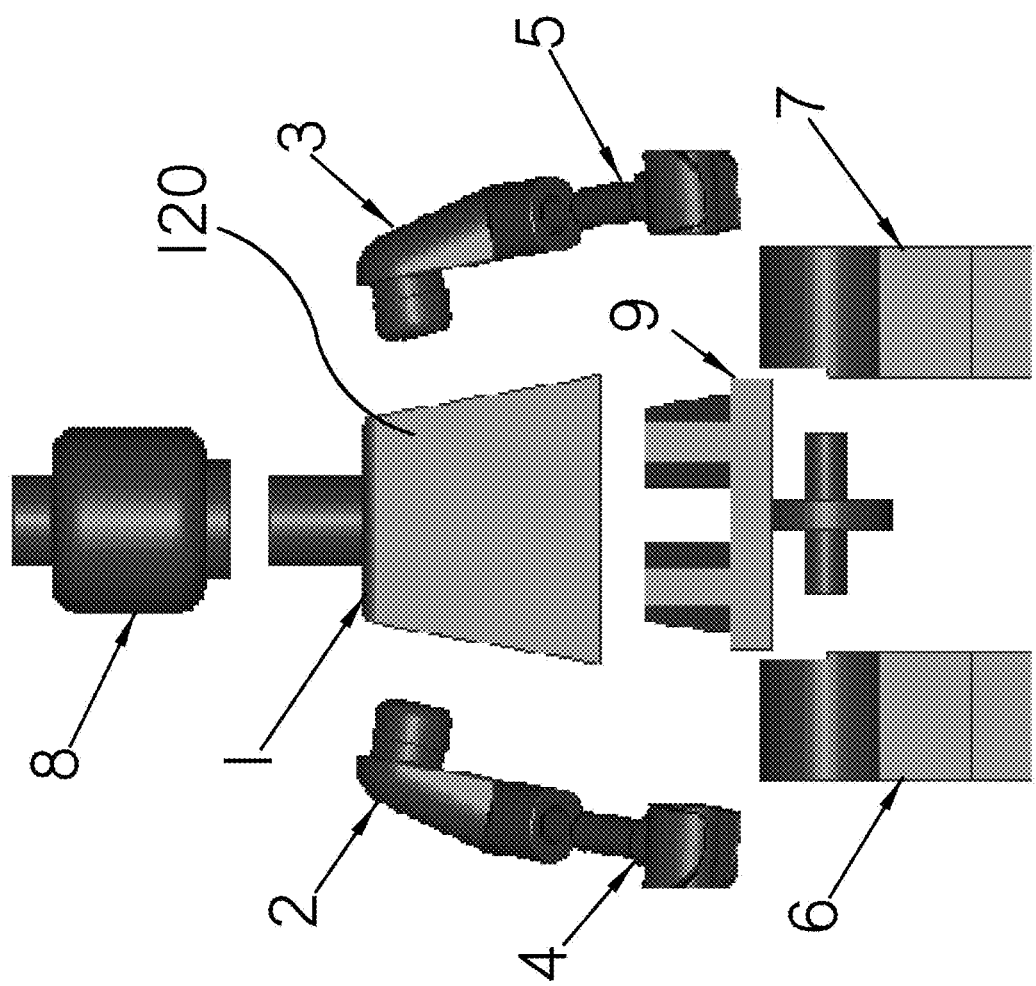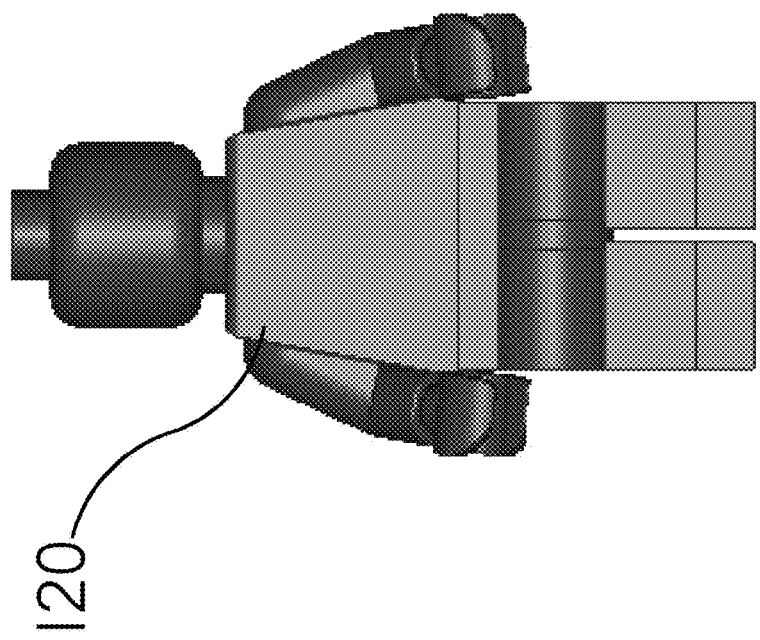
Fig 1B
Fig 1A

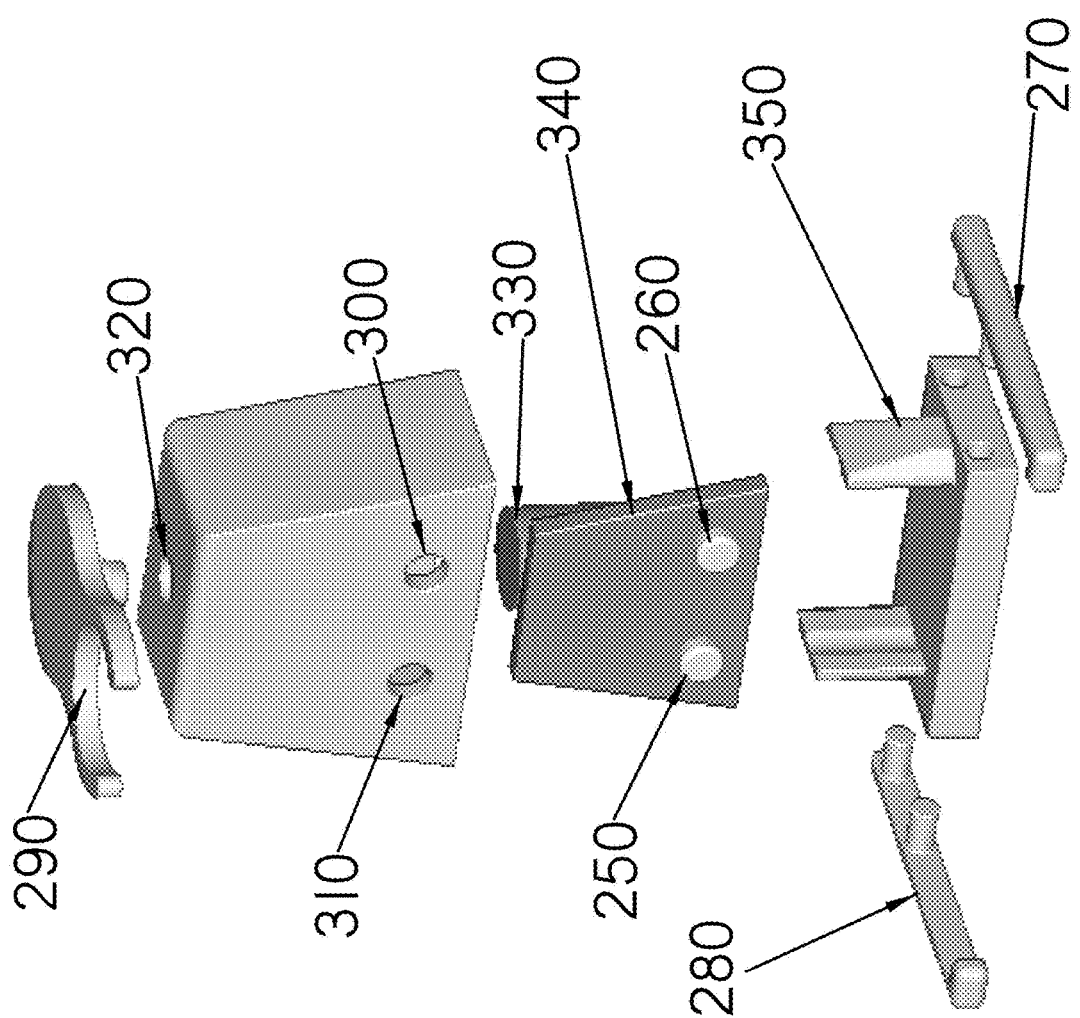

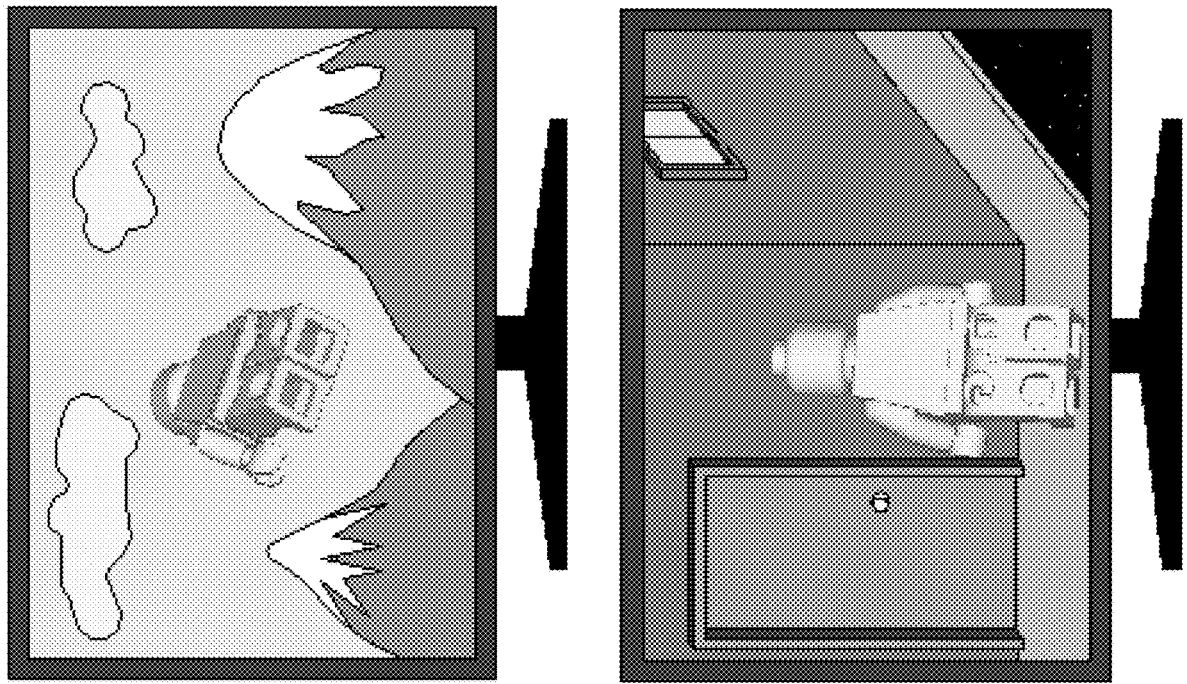
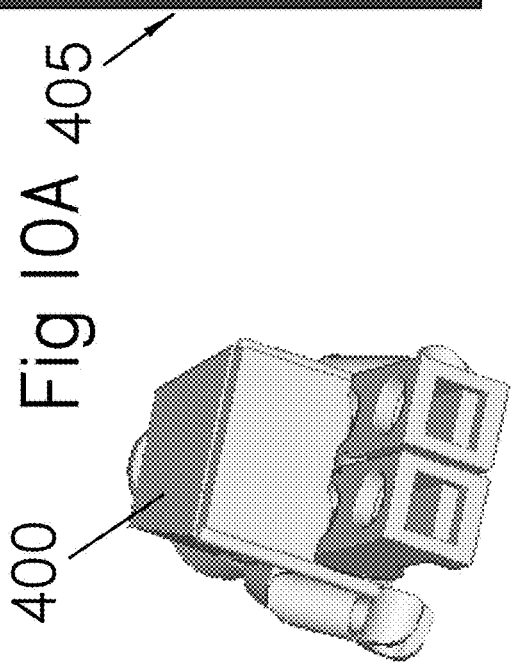
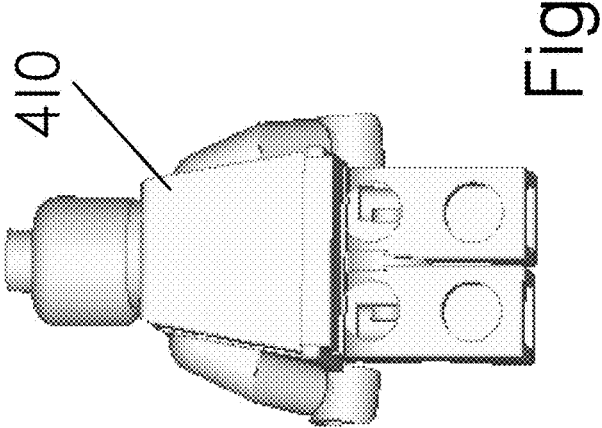
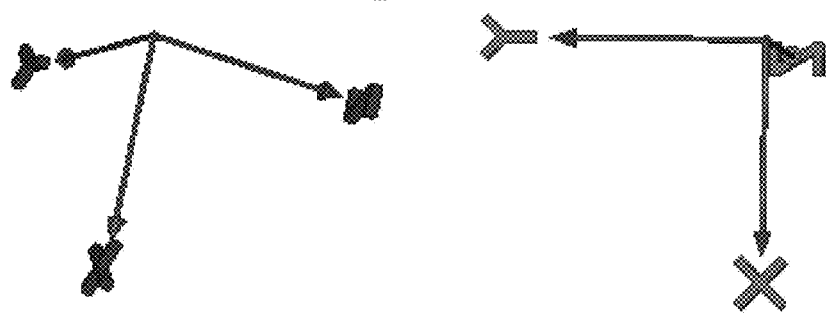
Fig 10A
Fig 10B

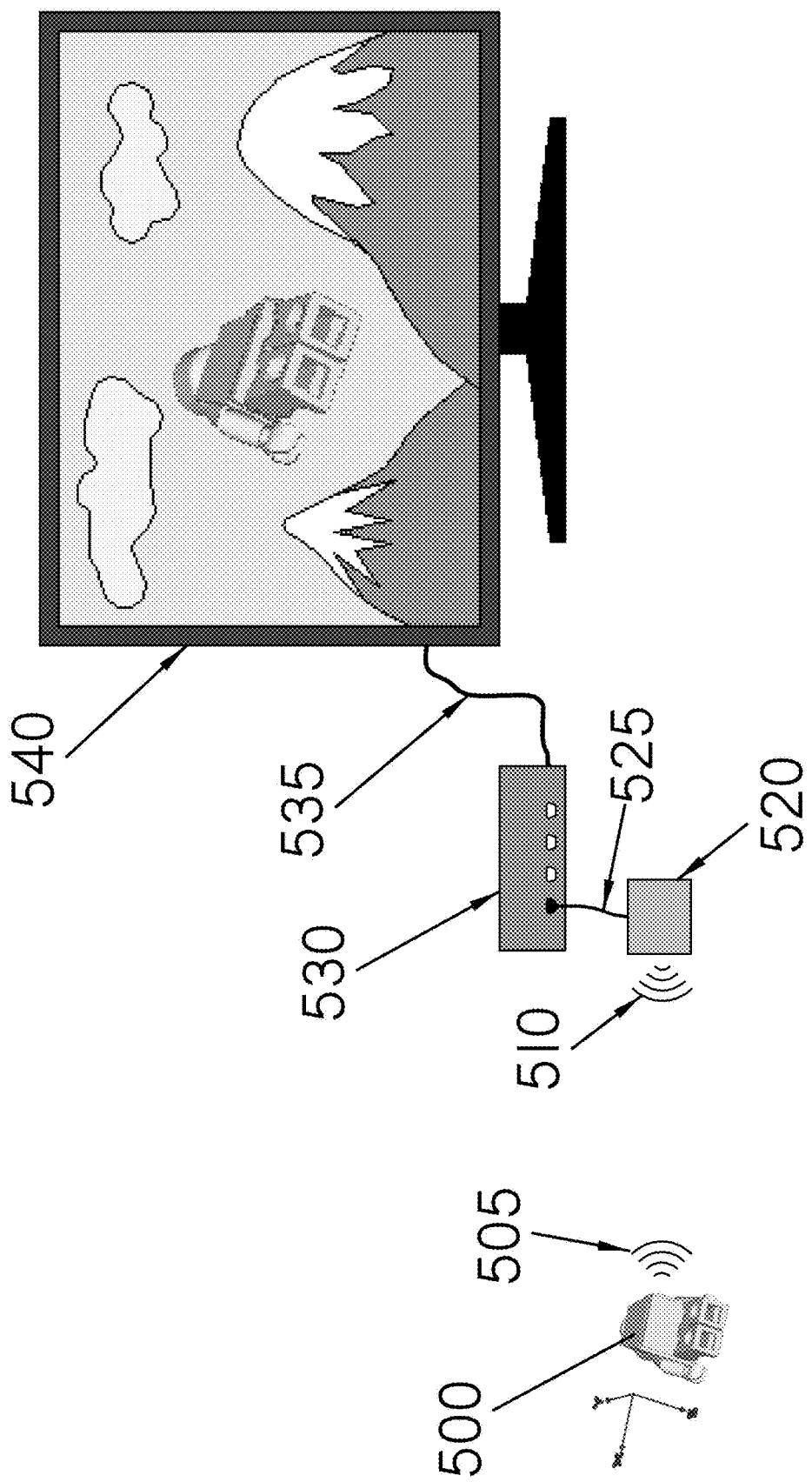

TOY ACTION FIGURE WITH REMOTE AND LOCAL POWER, PLAY, IDENTIFICATION, AND SELECTIVE ACTIVATION

CROSS-REFERENCES

This patent application claims the benefit of provisional patent application No. 62/991,372, by Joseph J. Bango and Michael Dziekan, entitled "Remote and Local Power, Play, Identification, and Selective Activation of Toy Action Figures", filed on Mar. 18, 2020, and which provisional application is fully incorporated by reference herein.

FIELD OF THE INVENTION

This patent discloses methods for providing stored energy to electronic devices, preferably toy figures, so that the toy can provide selective energy emission in the form of transmissive and/or reflective light, kinetic action, sound and/or speech emission, and/or interactive video game interaction.

BACKGROUND

Children's toys are often popular for a short period of time. Toys that have a long-lasting popularity tend to key on specific creative aspects of the player. One of these is the snap together product known today as Lego's.

The Lego Group began in the carpentry workshop of Ole Kirk Christiansen, in Billund, Denmark. In 1916, Christiansen purchased a woodworking shop in Billund which had been in business since 1895. The shop mostly helped construct houses and furniture, and had a small staff of apprentices. The workshop burned down in 1924 when a fire ignited some wood shavings. Ole Kirk constructed a larger workshop, and worked towards expanding his business even further. When the Great Depression hit, Ole Kirk had fewer customers and had to focus on smaller projects. He began producing miniature versions of his products as design aids. It was these miniature models of stepladders and ironing boards that inspired him to begin producing toys.

In 1932, Ole Kirk's shop started making wooden toys such as piggy banks, pull toys, cars and trucks and houses. The business was not profitable because of the Great Depression. Farmers in the area sometimes traded food in exchange for his toys; Ole Kirk continued producing practical furniture in addition to toys to stay in business. In the mid-1930s, the yo-yo toy fad gave him a brief period of increased activity until it suddenly collapsed. Ole Kirk used the leftover yo-yo parts as wheels for toy trucks, to reduce waste. His son Godtfred began working for him, taking an active role in the company.

In 1934, Ole Kirk held a contest among his staff to name the company, offering a bottle of homemade wine as a prize. Christiansen was considering two names himself, "Legio" (with the implication of a "Legion of toys") and "Lego", a self-made contraction from the Danish phrase "leg godt", meaning "play well." Later the Lego Group discovered that "Lego" can be loosely interpreted as "I put together" or "I assemble" in Latin. Ole Kirk selected his own name, Lego, and the company began using it on their products.

Following World War II, plastics became available in Denmark, and Lego purchased a plastic injection molding machine in 1947. One of the first modular toys to be produced was a truck that could be taken apart and re-assembled. In 1947, Ole Kirk and Godtfred obtained samples of interlocking plastic bricks produced by the company Kiddicraft. These "Kiddicraft Self-Locking Building Bricks" were designed by Hilary Page. In 1939, Page had applied for a patent on hollow plastic cubes with four studs on top (British Patent N° 0.529,580) that allowed their positioning atop one another without lateral movement. In 1944, Page applied an "Improvement to Toy Building Blocks" as an addition to the previous patent, in which he describes a building system based on rectangular hollow blocks with 2×4 studs on top enabling the construction of walls with staggered rows and window openings. The addition was granted in 1947 as British Patent N° 587,206. In 1949, the Lego Group began producing similar bricks, calling them "Automatic Binding Bricks." Lego bricks, then manufactured from cellulose acetate, were developed in the spirit of traditional wooden blocks that could be stacked upon one another but could be "locked" together. They had several round "studs" on top, and a hollow rectangular bottom. They would stick together, but not so tightly that they could not be pulled apart. In 1953, the bricks were given a new name: "Lego Mursten", or "Lego Bricks."

Plastic products were not well received by customers initially, who preferred wooden or metal toys. Many of Lego's shipments were returned, following poor sales. In 1954, Godtfred had become the junior managing director of the Lego Group. Godtfred's conversation with an overseas buyer struck the idea of a toy "system", with many toys in a line of related products. Godtfred evaluated their available products, and saw the plastic bricks as the best candidate for such a "system". In 1955, Lego released the "Town Plan" as such a system, using the building bricks.

The building bricks were moderately received, but had some problems from a technical standpoint: their "locking" ability was limited, and they were not versatile. In 1958 the bricks were improved with hollow tubes in the underside of the brick. This added support in the base, enabling much better locking ability and improved versatility. The company patented the new design, as well as several similar designs to avoid competition. Ole Kirk Christiansen died that same year, and Godtfred inherited leadership of the company.

Another warehouse fire struck the Lego Group in 1960, consuming most of the company's inventory of wooden toys. Godtfred decided that the plastic line was strong enough to abandon production of wooden toys. As a result, Godtfred's brothers Gerhardt (then head of wooden toys) and Karl Georg left the Lego Company and began a separate company "Bilofix". By the end of the year, the Lego Group was employing more than 450 people.

In 1961, Lego wished to expand sales to North America, but did not have the logistical capabilities to do so. Lego made an arrangement allowing Samsonite to begin producing and selling Lego products in the United States and Canada.

1961 and 1962 saw the introduction of the first Lego wheels, an addition that expanded the potential for building cars, trucks, buses and other vehicles from Lego bricks. Also during this time, the Lego Group introduced toys specifically targeted towards the pre-school market.

In 1963, cellulose acetate, the material used to create Lego bricks, was replaced by the more stable acrylonitrile butadiene styrene (ABS plastic), which is still used today. ABS is non-toxic, is less prone to discoloration and warping, and is more resistant to heat, acids, salt, and other chemicals. Samsonite manufacturing in North America did not switch at the same time, and still used some degree of cellulose acetate in its Lego products.

1964 was the first year that instruction manuals were included in Lego sets. One of the LEGO Group's most successful series,[citation needed] the Lego train system, was released in 1966. The original train sets included a 4.5-volt motor, battery box and rails; two years later, a 12-volt motor was introduced.

On 7 Jun. 1968, the first Legoland Park was opened in Billund. This theme park featured elaborate models of miniature towns built entirely from Lego bricks. The three acre (12,000 m$^2$) park attracted 625,000 visitors in its first year alone. During the next 20 years, the park grew to more than eight times its original size, and eventually averaged close to a million paying visitors per year. More than eighteen million Lego sets were sold in 1968.

In 1969, the Duplo system went on sale. Duplo bricks are much larger than Lego bricks, making them safer for young children, but the two systems are compatible: Lego bricks can be fitted neatly onto Duplo bricks, making the transition to the Lego system easily made as children outgrow their Duplo bricks. The name Duplo comes from the Latin word duplus, which translates literally as double, meaning that a Duplo brick is exactly twice the dimension of a Lego building brick (2×height by 2×width by 2×depth=8×the volume of a brick).

During the last three decades of the 20th century Lego expanded into new areas of toy making and marketing. In 1971, Lego began to target girls by introducing furniture pieces and dollhouses. In 1972, Lego added boat and ship sets, with floating hull pieces.

During this same period, Godtfred Kirk Christiansen's son, Kjeld Kirk Kristiansen, joined the managerial staff, after earning business degrees in Switzerland and Denmark. One of Kjeld's first achievements with the company was the foundation of manufacturing facilities, as well as a research and development department that would be responsible for keeping the company's manufacturing methods up to date. Human figures with posable arms made an appearance in 1974 in "Lego family" sets, which went on to become the biggest sellers at the time; in the same year, an early version of the "minifigure" miniature Lego person was introduced, but it was not posable and had no face printed on its head. A Lego production plant was opened in Enfield, Conn. in the United States.

In 1975 "Expert Series" sets were introduced, geared towards older, more experienced Lego builders followed by the "Expert Builder" sets in 1977. The technical sets featured moving parts such as gears, differentials, cogs, levers, axles and universal joints, and permitted the construction of realistic models such as automobiles, with functional rack and pinion steering and lifelike engine movements. In 1978 the Lego "minifigure" was added. These small Lego people have posable arms and legs, and a smile. The figure was used in many varieties of Lego sets, allowing construction of towns populated with the smiling minifigure Lego citizens.

In 1979 Lego expanded into space with the creation of Lego Space sets with astronaut minifigures, rockets, lunar rovers and spaceships and the Scala series, featuring jewelry elements marketed towards young girls. Kjeld Kirk Kristiansen became the president of Lego in this year.

Since the 1960s, educators saw Lego bricks' constructive potential as being an invaluable asset in helping children to develop creativity and problem-solving abilities. Teachers had been using Lego bricks in the classroom for a variety of reasons. In 1980, the Lego Group established the Educational Products Department (eventually renamed Lego Dacta, in 1989), to expand the educational possibilities of their toys. A packing and assembly factory opened in Switzerland, followed by another in Jutland, Denmark that manufactured Lego tires.

Between the 1960s and 90s Lego worked with Royal Dutch Shell in allowing Shell branding on certain items. In 1981, the second generation of Lego trains appeared. As before, these were available in either 4.5 V (battery powered) or 12 V (mains powered), but with a much wider variety of accessories, including working lights, remote-controlled points and signals, and decouplers.

The "Expert Builder" series matured in 1982, becoming the "Technic" series. 13 August of that year marked the Lego Group's 50th anniversary; the book 50 Years of Play was published to commemorate the occasion. In the following year, the Duplo system was expanded to include sets for even younger audiences, particularly infants; new sets included baby rattles and figures with adjustable limbs. The year after, Lego minifigure citizens gained a realm of knights and horses, with the introduction of the first Castle sets. Light & Sound sets made their appearance in 1985; these sets included a battery pack with electrical lights, buzzers, and other accessories to add another dimension of realism to Lego creations. Also that year, the Lego Group's educational division produced the Technic Computer Control, which was an educational system whereby Technic robots, trucks, and other motorized models could be controlled with a computer. Manaus, Brazil gained a Lego factory in this year, as well.

In 1984, the Technic line was expanded with the addition of pneumatic components. In August 1988, 38 children from 17 different countries took part in the first Lego World Cup building contest, held in Billund. That same year, Lego Canada was established. The Lego line grew again in 1989 with the release of the Lego Pirates series, which featured a variety of pirate ships, desert islands and treasure; the series was also the first to depart from the standard minifigure smiling face to create an array of piratical characters. The Lego Group's Educational Products Department was renamed Lego Dakta in this year; the name is derived from the Greek word "didactic", which roughly means "the study of the learning process." MIT's Dr. Seymour Papert, from the Laboratory of Computer Learning, was named "Lego Professor of Learning Research," after his ongoing work in linking the Logo programming language with Lego products.

Until 1989 Lego minifigures only came in a yellow skin color with standard smiling face, though early prototypes had a variety of skin colors and facial expressions. Lego Pirates in 1989 expanded the array of facial expressions with beards and eye patches, followed by sun glasses, lipstick, eyelashes, and so on. However, many older collectors resented the new look, saying they looked too "cartoon-ish" or "kiddy", and preferred the simplistic nature of the two eyes and smile.

In 1990 a new series designed for advanced builders was released. Three Model Team sets, including a race car and an off-road vehicle, featured a level of detail and realism not previously seen in any Lego series. Where Technic was mechanically accurate, Model Team was visually and stylistically accurate. The Lego Group became one of the top 10 toy companies in this year; it was the only toy company in Europe to be among the top 10. Legoland Billund had more than one million visitors in this year, for the first time in its history. The first-ever "Lego Professor of Business Dynamics," Xavier Gilbert, was appointed to an endowed chair at the International Institute for Management Development in Lausanne, Switzerland. Lego Malaysia was also established in 1990. In 1991, the Lego Group standardized its electrical components and systems; the Trains and Technic motors were made 9V to bring the systems into line with the rest of the Lego range.

In 1992 two Guinness records were set using Lego products: A castle made from 400,000 Lego bricks, and measuring 4.45 meters by 5.22 meters, was built on Swedish television, and a 545 meters long Lego railway line with three locomotives was constructed. Duplo was augmented with the addition of the Toolo line featuring a screwdriver, wrench, nuts and bolts; the Paradisa line, targeted towards girls, brought a variety of new pastel colors into the Lego system and focused around horses and a beach theme. In 1993 a Duplo train and a parrot-shaped "brickvac" that could scoop Lego pieces up off the floor were released.

In the late 1990s, the Lego Group brought out a series of new and specialized ranges aimed at particular demographics. The Slizers/Throwbots line preceded the Bionicle range, and uses Technic pieces and specialist moldings to create a set of action figures for boys, while Belville is a more conventional line aimed at girls and featuring large posable figures like those in the Technic range. A "Lego 4 Juniors" group features 2-inch (51 mm) tall medium-sized figures ("medi-figure") without jointed arms, and longer legs than the classic Lego minifigure. In 2003, the Lego Group introduced a completely new system, Clikits, aimed at girls and consisting of customizable plastic jewelry and accessories. In 2004, Lego added the QUATRO brick, for ages 1-3. Much like Duplo, a Quatro brick is four times the dimension of a regular Lego brick, and is compatible with the Duplo brick. Also that year, they created the second line of Knights Kingdom themed product.

Despite the popularity of Lego figures and similar competitive products, there exists a limitation of play modes for the user-child. The ability of a Lego-like toy figurine to move, emit sound, change facial expression, and respond to external user defined, game defined, or other stimuli, would add vast new dimensions of play for the user. The disclosed invention allows the potential for the realization of a more realistic and adaptive toy figure.

In yet another aspect of the disclosed invention, the ability of the toy figurine to become incorporated into a video game is made possible by the interactive simplex "polling" of figures using radio frequency, magnetic, electric, optical or acoustic means. Complete duplex data "handshake" is disclosed that can identify the toy figurine power status, figure type, and proclaimed game capabilities.

Thus there is a need for a toy action figure with remote and local power, play, identification, and selective activation that overcomes the above listed and other disadvantages.

SUMMARY OF THE INVENTION

The invention relates to a toy figure with a changeable face comprising: a head; a facial area located on the head; a torso attached to the head; a pair of arms attached to the torso; a pair of legs attached to the torso; changeable markings located on the facial area, the changeable markings will change when the changeable markings receive a stimuli.

The invention also relates to a toy figure backpack comprising: a container, the container comprising a front side configured to abut against a toy figure, and a rear side; attachment means located on the container, and configured to removeably attach to the toy figure; a pair of electrically conductive contacts located on the front side; a pc board in communication with the pair of electrically conductive contacts, the pc board located within the container; a power supply located within the container and in communication with the pc board.

BRIEF DESCRIPTION OF THE DRAWINGS

FIG. 1A is a front view of an action figure;
FIG. 1B is an exploded view of the action figure from FIG. 1A;
FIG. 9 is an exploded view of the power pack;
FIG. 10A is a drawing that depicts two 3-axis sensitive modified action figures in a first orientation;
FIG. 10B is a drawing that depicts two 3-axis sensitive modified action figures in a second first orientation;
FIG. 11 is a schematic showing the modified action figure in different orientations with its physical orientations mimicked by a video game by use of a wireless interface in place of a game controller.

DETAILED DESCRIPTION OF THE INVENTION

Figure 2B:
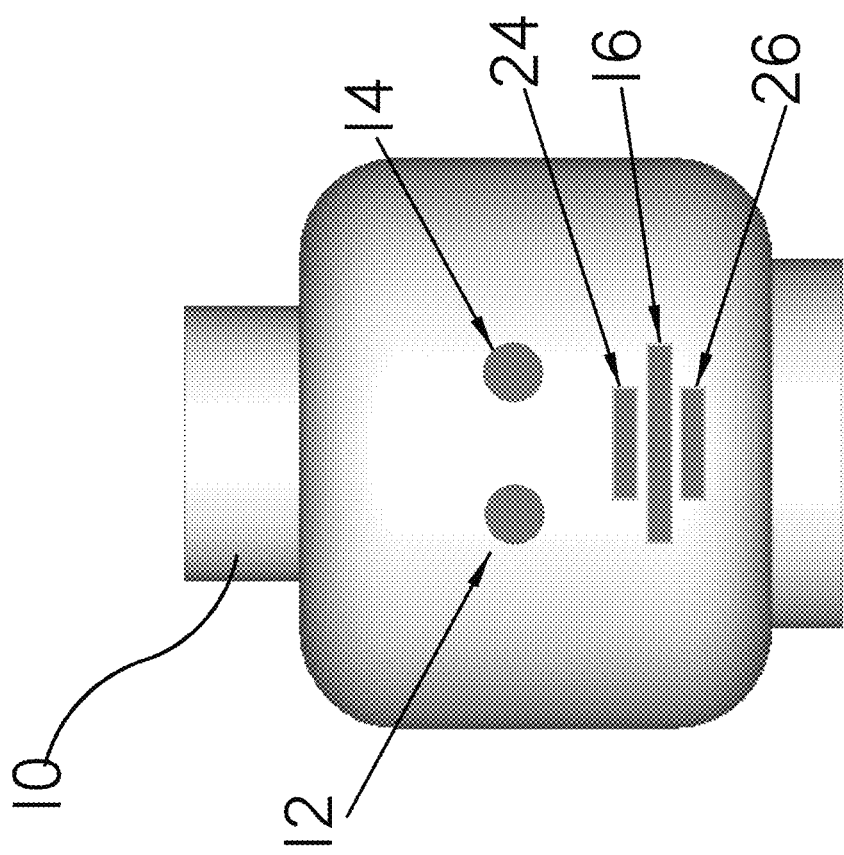
FIG. 2B is the head from FIG. 2A but in an excited state.

The ability of a Lego-like toy figurine to move, emit sound, change facial expression, and respond to external user defined, game defined, or other stimuli, would add vast new dimensions of play for the user. The disclosed invention allows the potential for the realization of a more realistic and adaptive toy figure.

In yet another aspect of the disclosed invention, the ability of the toy figurine to become incorporated into a video game is made possible by the interactive simplex "polling" of figures using radio frequency, magnetic, electric, optical or acoustic means. Complete duplex data "handshake" is disclosed that can identify the toy figurine power status, figure type, and proclaimed game capabilities.

The toy figurines require an electrical power source. In a toy figurine as small as a Lego, the power source should be rechargeable, have low hysteresis, non-toxic, eco-friendly, lightweight, and small in size necessitating high energy density. The ultimate energy storage device should have high energy density that can be released rapidly. High-energy batteries have been developed as single-use or rechargeable systems but may require minutes to hours to discharge, and not seconds. Although high power, standard capacitors are capable of discharging rapidly, they have low energy density. First generation supercapacitors also referred to as ultracapacitors and Electrochemical Double Layer Capacitors (EDLC), have relatively high energy density but also very high ESR (equivalent series resistance) and are therefore only used in very low power memory backup applications. New aerogel supercapacitors have been developed incorporating both the high energy density of batteries (100 times the energy of electrolytic capacitors) and the high power of capacitors (10 to 100 times the power of batteries). Like the toy figurine described in this patent application disclosure, a growing number of applications today require short bursts of power, including phones, wireless modems, radio transceivers, motors, valves and solenoids.

An engineer now has two battery design options: (1) In a standard size toy, use a battery capable of the high pulse current or (2) or in a very small toy such as a Lego-like figurine, try to use a smaller battery with higher energy density (at the expense of lower power density) configured in parallel with a high power supercapacitor. The second option is known as a battery-supercapacitor hybrid configuration and results in a high energy/high power device with smaller size, lower weight and lower cost than the first option of a larger battery or power supply. ESR aerogel supercapacitors are capable of handling the high current pulse to minimize the voltage drop.

Main Power

The energy density for today's supercapacitors has grown substantially and is now only 3 to 10 times lower than some rechargeable batteries (i.e. lead-acid), but with the added benefits of nearly infinite cycle life, very short recharge times and very high power density. Supercapacitors can be charged directly from alkaline batteries, solar panels or other DC power sources. As a result some portable and remote applications are now using supercapacitors in place of rechargeable batteries.

The toy cars and airplanes that claim "Charge in under 10 seconds" all use supercapacitors as the main power source and alkaline batteries to charge them. The fast charge is particularly important for children as their attention spans are not long enough to wait for batteries to charge. Solar charging is particularly important in remote applications. With hundreds of possible charge/discharge cycles per year, rechargeable batteries require frequent replacement. These applications include remote monitoring systems, transmitters, lighting and traffic signs, and landscaping lights. New portable applications currently under development include flashlights, remote controls and radios all charged using solar power.

Photochromic Inks

Photochromic pigments from screen-printing suppliers in the form of Photochromic Plastisol Inks. One source for these in the US is the Union Ink Company, who lists it among their specialty inks. They write, "Photochromic Plastisol Inks are almost colorless when viewed indoors but when viewed outside or under a source of intense UV light they quickly acquire a rich, bright color.

In an embodiment, the photochromic ink or paint should have a white base color to blend in with a white toy figurine head color that is also white or a color that matches the photochromic ink or paint base color, whatever that may be, minimizing the contrast between the two. In a embodiment, the photochromic ink or paint is covered on the outside of the toy figurine with a heavy UV sun blocker clearcoat, so as to mitigate the transmission of ultraviolet light outside of the toy and to help prevent a photochromic paint color change due to an external ultraviolet source, such as the sun.

Photochromic material is inherently unstable, and actually changes its chemical structure when exposed to UV light. Because the dye is so vulnerable in its excited state, stabilization is the prime challenge for photochromic ink manufacturers. Without stabilization, most photochromic inks would not last even a few days in sunshine and may even expire before being printed. In an embodiment, the photochromic material applied to the toy figurine should have a high fatigue resistance. As the degradation of photochromic inks or paints are more a function of UV exposure than the number of times it changes color, the use of a transitory internal LED UV source is preferred over sunlight activation.

Thermochromic

Another variation of the disclosed invention includes the use of thermochromic inks or paints on the surface of the toy figurine to effect a change in the facial expression or any other reflective image on the toy. Thermochromism is the property of substances to change color due to a change in temperature. A mood ring is an excellent example of this phenomenon, but thermochromism also has more practical uses, e.g. in baby bottles (changes to a different color when cool enough to drink) or kettles (change when water is at or near boiling point). Thermochromism is one of several types of chromism.

Electrochromic

Another variation of the disclosed invention includes the use of electrochromic inks or paints on the surface of the toy figurine to effect a change in the facial expression or any other reflective image on the toy. The Electrochromic device (ECD) controls the optical properties such as optical transmission, absorption, polarization, reflectance, and/or emittance in a continual but reversible manner on application of a voltage. This property enables the ECD to be used for applications like smart-window, electrochromic mirror, and electrochromic display devices.

LCD

Another variation of the disclosed invention includes the use of liquid crystals on the surface of the toy figurine to effect a change in the facial expression or any other reflective image on the toy. A liquid-crystal display (LCD) is a flat panel display, electronic visual display, or video display that uses the light modulating properties of liquid crystals. Liquid crystals do not emit light directly.

LCDs are available to display arbitrary images (as in a general-purpose computer display) or fixed images which can be displayed or hidden, such as preset words, digits, and 7-segment displays as in a digital clock. They use the same basic technology, except that arbitrary images are made up of a large number of small pixels, while other displays have larger elements. Each pixel of an LCD consists of a layer of molecules aligned between two transparent electrodes, and two polarizing filters (parallel and perpendicular), the axes of transmission of which are (in most of the cases) perpendicular to each other. Without the liquid crystal between the polarizing filters, light passing through the first filter would be blocked by the second (crossed) polarizer.

Before an electric field is applied, the orientations of the liquid-crystal molecules are determined by the alignment at the surfaces of electrodes. In a twisted nematic device (still the most common liquid-crystal device), the surface alignment directions at the two electrodes are perpendicular to each other, and so the molecules arrange themselves in a helical structure, or twist. This induces the rotation of the polarization of the incident light, and the device appears gray. If the applied voltage is large enough, the liquid crystal molecules in the center of the layer are almost completely untwisted and the polarization of the incident light is not rotated as it passes through the liquid crystal layer. This light will then be mainly polarized perpendicular to the second filter, and thus be blocked and the pixel will appear black. By controlling the voltage applied across the liquid crystal layer in each pixel, light can be allowed to pass through in varying amounts thus constituting different levels of gray.

LED

In yet another variation of the disclosed invention includes the use of LED's inside of, or on the surface of the toy figurine to effect a change in the facial expression or any other transmissive rather than reflective image on the toy. A light-emitting diode (LED) is a semiconductor light source. It is a pn-junction diode, which emit photons when properly biased. When a suitable voltage is applied to the leads, electrons are able to recombine with holes within the device, releasing energy in the form of photons. This effect is called electroluminescence, and the color of the light is determined by the energy band gap of the semiconductor.

Organic LED or OLED

In still yet another variation of the disclosed invention includes the use of organic LEDs on the surface of the toy figurine to effect a change in the facial expression or any other transmissive image on the toy. An organic light-emitting diode (OLED) is a light-emitting diode (LED) in which the emissive electroluminescent layer is a film of organic compound which emits light in response to an electric current. This layer of organic semiconductor is situated between two electrodes; at least one of these electrodes may be transparent. OLEDs are used to create digital displays in devices such as television screens, computer monitors, portable systems such as mobile phones, handheld game consoles and PDAs. A major area of research is the development of white OLED devices for use in solid-state lighting applications.

There are two main families of OLED: those based on small molecules and those employing polymers. Adding mobile ions to an OLED creates a light-emitting electrochemical cell (LEC) which has a slightly different mode of operation. OLED displays can use either passive-matrix (PMOLED) or active-matrix addressing schemes. Active-matrix OLEDs (AMOLED) require a thin-film transistor backplane to switch each individual pixel on or off, but allow for higher resolution and larger display sizes.

An OLED display works without a backlight; thus, it can display deep black levels and can be thinner and lighter than a liquid crystal display (LCD). In low ambient light conditions (such as a dark room), an OLED screen can achieve a higher contrast ratio than an LCD, regardless of whether the LCD uses cold cathode fluorescent lamps or an LED backlight. An OLED is composed of a layer of organic materials situated between two electrodes, the anode and cathode, all deposited on a substrate. The organic molecules are electrically conductive as a result of delocalization of it-electrons caused by conjugation over part or all of the molecule. These materials have conductivity levels ranging from insulators to conductors, and are therefore considered organic semiconductors. The highest occupied and lowest unoccupied molecular orbitals (HOMO and LUMO) of organic semiconductors are analogous to the valence and conduction bands of inorganic semiconductors.

Originally, the most basic polymer OLEDs consisted of a single organic layer. One example was the first light-emitting device synthesized by J. H. Burroughes et al., which involved a single layer of poly(p-phenylene vinylene). However multilayer OLEDs can be fabricated with two or more layers in order to improve device efficiency. As well as conductive properties, different materials may be chosen to aid charge injection at electrodes by providing a more gradual electronic profile, or block a charge from reaching the opposite electrode and being wasted. Many modern OLEDs incorporate a simple bilayer structure, consisting of a conductive layer and an emissive layer. More recent developments in OLED architecture improves quantum efficiency (up to 19%) by using a graded heterojunction. In the graded heterojunction architecture, the composition of hole and electron-transport materials varies continuously within the emissive layer with a dopant emitter. The graded heterojunction architecture combines the benefits of both conventional architectures by improving charge injection while simultaneously balancing charge transport within the emissive region.

During operation, a voltage is applied across the OLED such that the anode is positive with respect to the cathode. Anodes are picked based upon the quality of their optical transparency, electrical conductivity, and chemical stability. A current of electrons flows through the device from cathode to anode, as electrons are injected into the LUMO of the organic layer at the cathode and withdrawn from the HOMO at the anode. This latter process may also be described as the injection of electron holes into the HOMO. Electrostatic forces bring the electrons and the holes towards each other and they recombine forming an exciton, a bound state of the electron and hole. This happens closer to the emissive layer, because in organic semiconductors holes are generally more mobile than electrons. The decay of this excited state results in a relaxation of the energy levels of the electron, accompanied by emission of radiation whose wavelength is in the visible region. The wavelength of this radiation depends on the band gap of the material, in this case the difference in energy between the HOMO and LUMO.

As electrons and holes are fermions with half-integer spin, an exciton may either be in a singlet state or a triplet state depending on how the spins of the electron and hole have been combined. Statistically three triplet excitons will be formed for each singlet exciton. Decay from triplet states (phosphorescence) is spin forbidden, increasing the timescale of the transition and limiting the internal efficiency of fluorescent devices. Phosphorescent organic light-emitting diodes make use of spin-orbit interactions to facilitate intersystem crossing between singlet and triplet states, thus obtaining emission from both singlet and triplet states and improving the internal efficiency.

Electronic Paper

In another variation of the disclosed invention, the use of electronic paper or electronic inks or electronic paints on the surface of the toy figurine to effect a change in the facial expression or any other reflective image on the toy. Electronic paper, e-paper and electronic ink are display technologies that mimic the appearance of ordinary ink on paper. Unlike conventional backlit flat panel displays that emit light, electronic paper displays reflect light just as paper does. This may make them more comfortable to read, and provide a wider viewing angle than most light-emitting displays. The contrast ratio in electronic displays available as of 2008 approaches newspaper, and newly developed displays are slightly better. An ideal e-paper display can be read in direct sunlight without the image appearing to fade.

Many electronic paper technologies hold static text and images indefinitely without electricity. Flexible electronic paper uses plastic substrates and plastic electronics for the display backplane. There is ongoing competition among manufacturers to provide full-color ability.

Electronic paper was first developed in the 1970s by Nick Sheridon at Xerox's Palo Alto Research Center. The first electronic paper, called Gyricon, consisted of polyethylene spheres between 75 and 106 micrometers across. Each sphere is a janus particle composed of negatively charged black plastic on one side and positively charged white plastic on the other (each bead is thus a dipole). The spheres are embedded in a transparent silicone sheet, with each sphere suspended in a bubble of oil so that they can rotate freely. The polarity of the voltage applied to each pair of electrodes then determines whether the white or black side is face-up, thus giving the pixel a white or black appearance. At the FPD 2008 exhibition, Japanese company Soken demonstrated a wall with electronic wall-paper using this technology. From 2007 Estonian company Visitret Displays is developing this kind of displays using PVDF as material for spheres dramatically improving the video speed and decreasing the control voltage.

In the simplest implementation of an electrophoretic display application of electronic paper, titanium dioxide (titania) particles approximately one micrometer in diameter are dispersed in a hydrocarbon oil. A dark-colored dye is also added to the oil, along with surfactants and charging agents that cause the particles to take on an electric charge. This mixture is placed between two parallel, conductive plates separated by a gap of 10 to 100 micrometers. When a voltage is applied across the two plates, the particles migrate electrophoretically to the plate that bears the opposite charge from that on the particles. When the particles are located at the front (viewing) side of the display, it appears white, because light is scattered back to the viewer by the high-index titania particles. When the particles are located at the rear side of the display, it appears dark, because the incident light is absorbed by the colored dye. If the rear electrode is divided into a number of small picture elements (pixels), then an image can be formed by applying the appropriate voltage to each region of the display to create a pattern of reflecting and absorbing regions.

Electrophoretic displays are considered prime examples of the electronic paper category, because of their paper-like appearance and low power consumption.

Examples of commercial electrophoretic displays include the high-resolution active matrix displays used in the Amazon Kindle, Barnes & Noble Nook, Sony Librie, Sony Reader, Kobo eReader and iRex iLiad e-readers. These displays are constructed from an electrophoretic imaging film manufactured by E Ink Corporation. A mobile phone that used the technology is the Motorola Fone.

Electrophoretic Display technology has also been developed by Sipix and Bridgestone/Delta. SiPix is now part of E Ink. The Sipix design uses a flexible 0.15 mm Microcup architecture, instead of E Ink's 0.04 mm diameter microcapsules. Bridgestone Corp.'s Advanced Materials Division cooperated with Delta Optoelectronics Inc. in developing the Quick Response Liquid Powder Display (QR-LPD) technology.

Electrophoretic displays can be manufactured using the Electronics on Plastic by Laser Release (EPLaR) process developed by Philips Research to enable existing AM-LCD manufacturing plants to create flexible plastic displays.

Integration Within A Video game and/or Virtual Environment

Less than a decade ago, the game company Activision began experimenting with toy figures that could be interrogated via radio frequency identification devices, or RFID chips. Embedded in the base of the toy, when moved into proximity of a coil that induced an electromagnetic field to power the RFID chip, an antenna in a toy base could begin one or two way data exchange with the chip, this being in the same base that also housed the AC field for powering the RFID chip. Validation of the data set in the RFID tag allowed the game software to 'recognize' said to figure, and integrate the toy figure virtually into an on-screen video game. Patent protection under U.S. Pat. Nos. 7,843,471, 8,858,339 and 8,894,462, describe numerous means of patent priority for electronic interrogation of a chip such as an RFID device, and integration of real world objects into a virtual world environment. However, not obvious and recorded in the prior art, is the means for a game piece identification base on visual cues as offered by the disclosed invention. In an embodiment of the disclosed invention, data preferably in the form of alphanumeric characters, barcodes, or other symbology is imprinted onto the real world object using a pigment, dye, ink, or other marking media, said media not having a reflected image visible to the naked human eye. In an embodiment, the toy object is interrogated or illuminated by a suitable wavelength light source, such as an ultraviolet LED, for a transient time period, such that a lifetime re-emission spectra may be detected by a CCD, CMOS, or other area array image detection device, or single point photodiode or other single point detector of the lifetime fluorescence event. The combination or barcode information and highly specific lifetime fluorescence time constant, provides high security against counterfeit gaming devices. An added benefit of the disclosed invention is that the cost of the gaming device is less to produce than a gaming device using an RFID chip.

Once the gaming figure is identified, and its avatar represented in a video game, interaction with the game can provide, in an embodiment, a serial optical data stream that instructs the gaming device to move, twist, generate facial reaction, and even speak, based on encoded instructions in a stand-alone internal PROM. The PROM and associated microcontroller or microprocessor, control the figure action response, deriving energy from the figure power pack. Inductive power coupling is another feature of the disclosed invention for powering the action figure, or re-charging the action figure power pack.

In yet another embodiment of the disclosed invention, the user can employ a virtual reality headset, and using a pin hole CCD camera installed in the toy action figure, view and interact with the real world as if the user were the toy.

In still yet another embodiment of the disclosed invention, the user may view the real world toy in an augmented reality forum, interacting collectively with an avatar and the real world toy and the real world environment.

FIG. 1A shows a drawing of a Lego miniature action figure. FIG. 1B shows an exploded view of the action figure 120. The action figure 120 is composed of a head 8, a torso 1, a right arm 2, a left arm 3, a torso base with leg connections 9, a left leg 7, a right leg 6, a left hand 5, and a right hand 4. Once the individual parts are snapped together, the action figure will not do anything unless a child physically moves an arm or leg to pretend that the action figure is a real person. What is needed is a method of portraying motion of the action figure without the need for a child to manually change the position of the arms, hands, legs, or head.

Figure 2A:
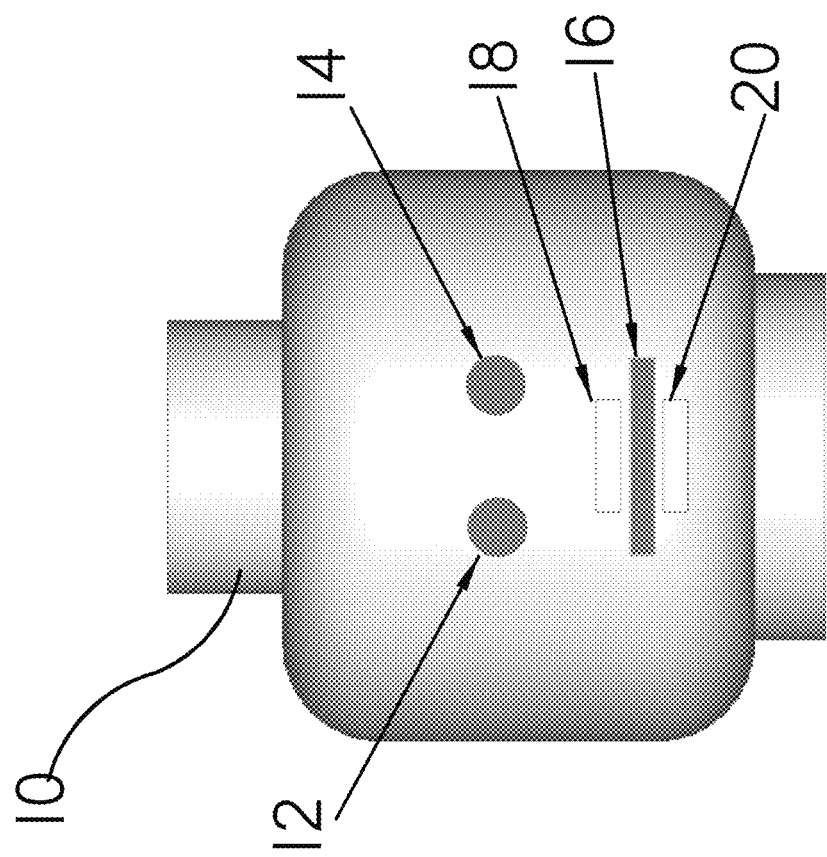
FIG. 2A is a front view of the head of an action figure.

FIGS. 2A and 2*b* shows a CAD drawing that depicts the head of a Lego action figure in two different conditions. The head 10 in FIG. 2A shows the unexcited state of the energy sensitive paint, with additional mouth parts 18 and 20 invisible to the naked eye. The eyes 12 and 14 are continually visible, along with the central portion of the mouth 16. In FIG. 2B, the head 10 show that when excited by the proper type of energy, the previously invisible mouth portions 24 and 26 now become momentarily visible. The energy sensitive paint has the properties that when it is excited by a specific type of energy, the paint will change its color to become visible due to the change in contrast between the excited color of the paint and the base color of the action figure. When the energy sensitive paint is in the unexcited state, the paints color and the base color of the action figure are virtually indistinguishable. When the energy sensitive paint is exposed to a specific energy sufficient to cause a color change, the contrast between the paint and base color of the action figure is now greatly enhanced, and the previously invisible painted sections are now easily visible to the naked eye.

In the case where only LED's or OLED's are used to mimic a talking action figure, there would be several visible LED placed inside the action figures head. One visible LED would be placed at the upper mouth section 24 and one visible LED would be placed at the lower mouth section 26. The two individual visible LED's could be operated together or independently. If the LED's are operated independently, this has the added advantage of enabling the upper portion of the mouth 24 or lower portion 26 of the mouth to be manipulated separately. It should be obvious to those skilled in the art, that additional individual visible LED's could be used in a like manner to create the intermittent appearance of eyebrows, or other facial expressions. It should be noted that if the LED's are small enough, such as in the case of a surface mount 0603 type LED, the LED's could be placed on the outer surface of the action figures face. If the LED's are placed within the action figures head, the addition of transparent or translucent plastic could be placed in place of the energy sensitive ink. This would allow the visible LED to shine light through the transparent or translucent portion of the action figures head, so as to become visible to someone looking at it. The action figures head could be made from a transparent or translucent polymer and painted or coated with an opaque substance. This would allow light to be transmitted only through the portions in which there is no opaque coating.

In the case where thermochromic inks are used to mimic a talking action figure, there would be several small heat sources placed inside the action figures head. One miniature momentary heat source would be placed at the upper mouth section 24 and one miniature momentary heat source would be placed at the lower mouth section 26. The two individual miniature momentary heat sources could be operated together or independently. If the miniature momentary heat sources are operated independently, this has the added advantage of enabling the upper portion of the mouth 24 or lower portion 26 of the mouth separately. It should be obvious to those skilled in the art, that additional miniature momentary heat sources could be used in a like manner to create the intermittent appearance of eyebrows, or other facial expressions.

In the case where electronic paper is used to mimic a talking action figure, there would either a small conformal section of electric paper placed within a transparent portion of the action figures head, or on the outer surface of an opaque action figures head. A facial expression could be "drawn" by switching on sections of the electronic paper to indicate a black or white sphere. For the case of action figures, the individual spheres could be made to be black on one side and yellow on the other, to blend in with the background color of the action figure. Each sphere is a janus particle composed of negatively charged black plastic on one side and positively charged white plastic on the other (each bead is thus a dipole). The spheres are embedded in a transparent silicone sheet, with each sphere suspended in a bubble of oil so that they can rotate freely. The polarity of the voltage applied to each pair of electrodes then determines whether the white or black side is face-up, thus giving the pixel a white (or yellow) or black appearance. By controlling the polarity of voltage to select portions of the electronic paper, a movable facial expression could be realized.

In the case where an LCD is used to mimic a talking action figure, there would either a small conformal section of electric paper placed within a transparent portion of the action figures head, or on the outer surface of an opaque action figures head. The LCD would contain either large, predetermined partial shapes of facial expressions, or many small individual pixels that could be used to create a wider variety of varying facial expressions.

In the case where electrochromic inks are used to mimic a talking action figure, there would be an electric field applied to the region on the face of the figure, a potential sufficient to make the electrochromic deposition become opaque, such that a smile of expression on the figure would appear to change shape. The entire figure surface could also be coated with a photochromic paint such that exposure to sunlight or an ultraviolet LED would appear to make the figure undergo a 'tan' or apparent darkening of the skin.

Figure 3B:
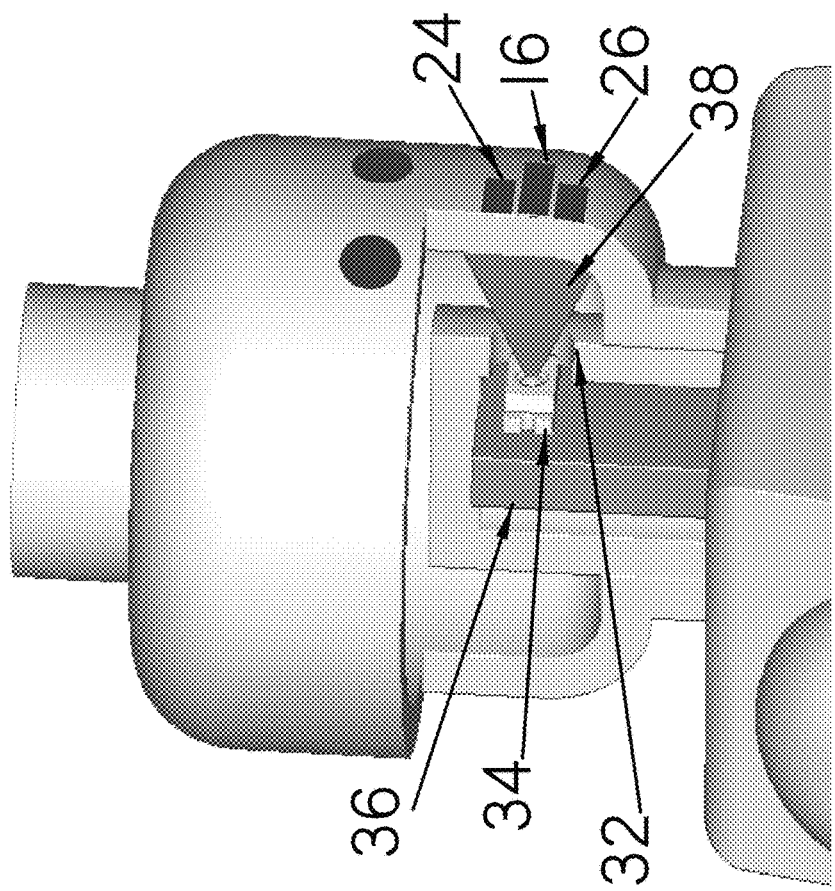
FIG. 3B is a cutaway view of the head from FIG. 3B but in an excited state.
Figure 3A:
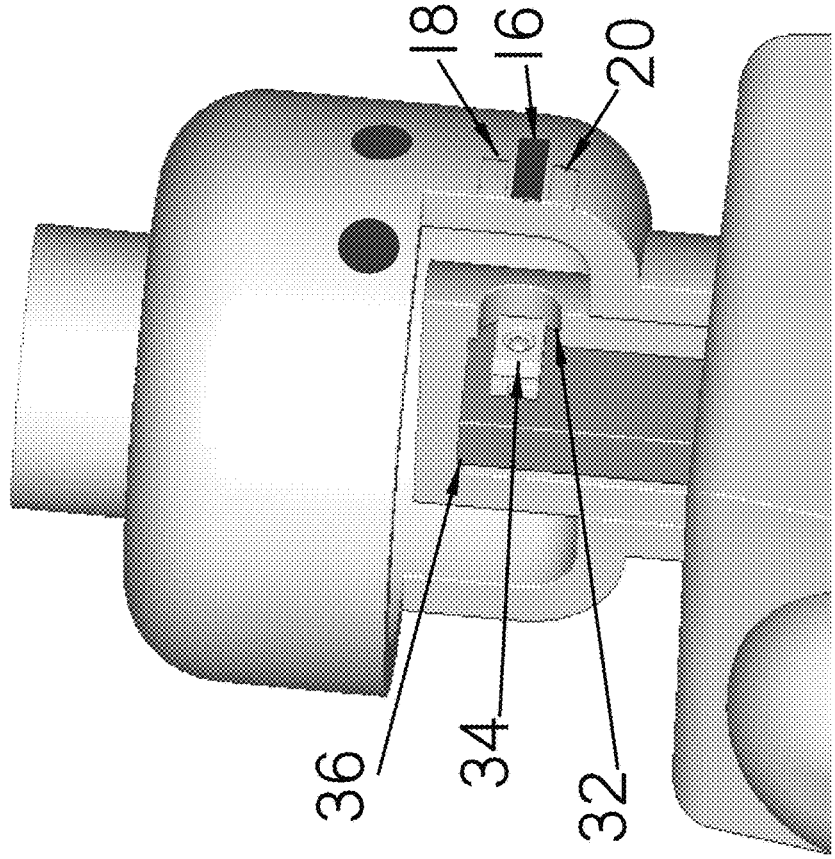
FIG. 3A is a cutaway view of the head of the action figure.

FIGS. 3A and 3B depicts a 3D CAD drawing of a cutaway view of an embodiment of the disclosed invention so the inner components can be viewed. FIG. 3A shows the action figure in the unexcited state, while FIG. 3B shows the figure in the excited state. By utilizing a narrow pc board 36 that contains a small surface mount LED 34, an optical energy source can be produced that will react with the energy sensitive paint in such a way as to render the paint visible by changing the color. A small orifice 32 is required to allow the optical radiation from the surface mount LED 34 to penetrate through to the inside surface of the head. When the surface mount LED 34 is not powered on, the additional mouth parts 18 and 20 are not visible to the naked eye, as the contrast between the paint and the base color of the action figure head is extremely low. When power is applied to the surface mount LED 34, a beam of optical energy 38 passes through the aperture 32 and illuminates the inside portion of the head. The material used to made the head is constructed of a polymer that will allow a portion (less than 100%, but greater than 50%) of the specific wavelength to penetrate through the head sufficient enough to cause a color change of the additional mouth parts 24 and 26 so that the optically excited paint is now a different color so that the contrast between the optically excited paint and the base color of the action figure is much greater than when the paint is in the unexcited state. By rapidly powering up the surface mount LED 34, the optical radiation 38 will cause a color shift of the additional mouth parts 24 and 26 to give the appearance that a mouth is moving, to mimic talking.

Although only one surface mount LED 34 is shown, additional surface mount LED's can be added that will allow for the animation of other facial features, such as eyebrows. The surface mount LED will have to be offset from the other so that the additional mouth parts 18 and 20 do not change color when trying to change color of one or both eyebrows. In addition to creating the simulated motion of a mouth to emulate a talking action figure, a small piezo transducer can be added that would actually transmit audible speech. The audible speech can be transmitted from a game console, computer, Smartphone, or laptop, wireless through Bluetooth, and processed by the microcontroller to be converted to sound by the piezo transducer. There are sensors, such as small motors that can be embedded within a small action figure to enable movement of arms and legs. As with many motors, they are capable of producing motion when electrical power is applied, as well as generating electrical power when motion is induced. This motion induced power can be translated by the microcontroller into an indication that a right arm or left leg has been moved, and can produce feedback into a game. When a modified action figure's right arm is raised in the up position by a child, a virtual action figures right arm can be displayed in the up position to emulate this action. As power technology improves, it will be possible for a small series of motors to manipulate the action figure so it can move in a limited fashion on its own. With contemporary power sources, and the amount of friction between articulated joints, this would be inefficient at the present time. But with a breakthrough in power technology such as a newer, higher density power source, this could easily become a reality. Although a motor was described, a series of small potentiometers could be attached to the articulated appendages to indicate the amount of movement that a child moves each individual appendage.

Figure 4:
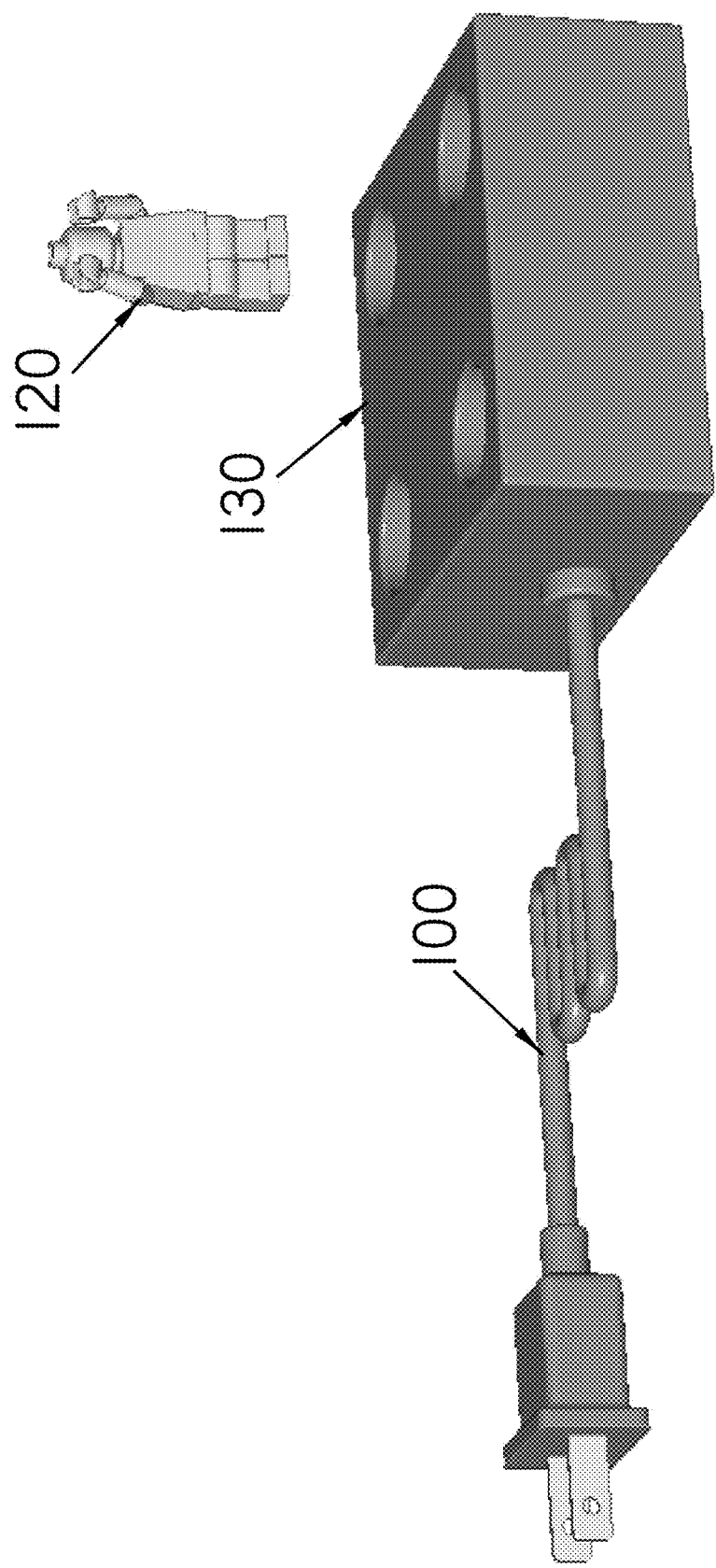
FIG. 4 is a perspective view of a charging station for multiple modified action figures with one action figure shown.

FIG. 4 shows a 3D CAD drawing depicting a wireless charging station 130 that is capable of charging up to four individual modified action figures 120. The wireless charging station 130 is plugged into a household power outlet by utilizing a power cord 100. The wireless charging station 130 contains four individual wells that are set to a depth to nearly that of the action figure height. Each individual well contains a coil of wire that produces an alternating current that will be inductively coupled to a resonant coil within the action figure. Four individual LED's will indicate when the charging cycle is complete. When a charging cycle is complete, that specific well LED will illuminate to alert the user that that action figure is fully charged and ready for use.

Figure 5:
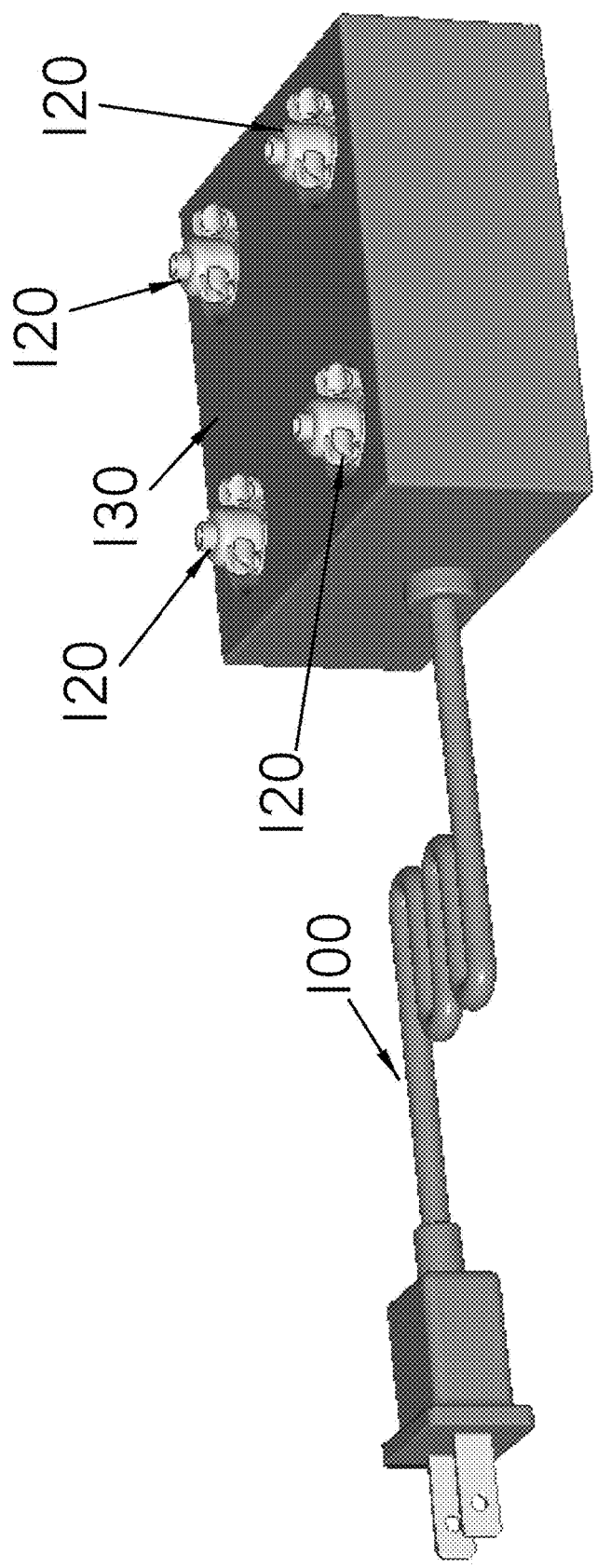
FIG. 5 is a perspective view of the charging station with four action figures.

FIG. 5 shows a 3D CAD drawing depicting a wireless charging station 130 that is capable of charging up to four individual modified action figures 120. The wireless charging station 130 is plugged into a household power outlet by utilizing a power cord 100. The wireless charging station 130 contains four individual wells that are set to a depth to nearly that of the action figure height. The drawing depicts that the four individual charging wells each contain a modified action figure 120. Each individual well contains a coil of wire that produces an alternating current that will be inductively coupled to a resonant coil within the action figure. Four individual LED's will indicate when the charging cycle is complete. When a charging cycle is complete, that specific well LED will illuminate to alert the user that that action figure is fully charged and ready for use.

Figure 6:
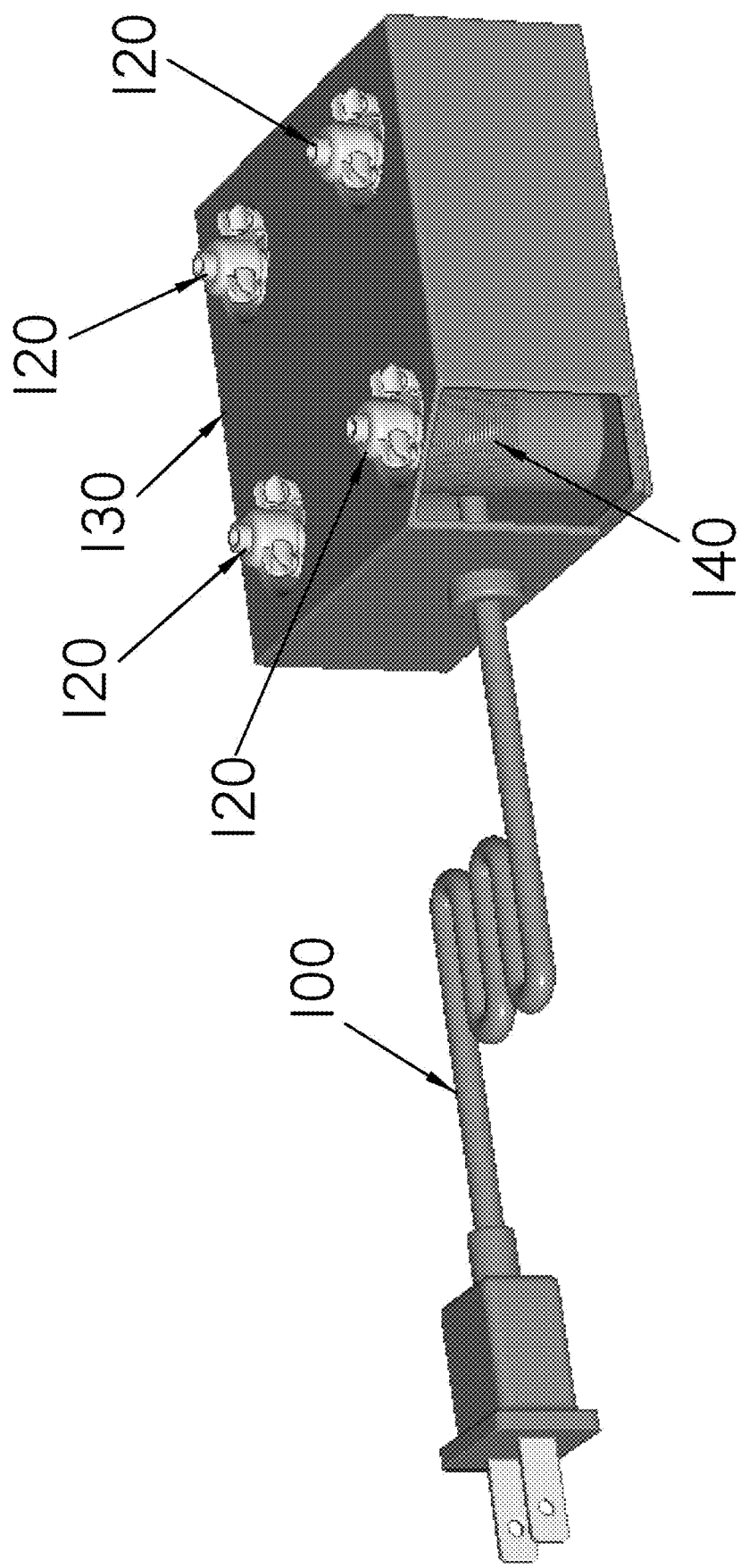
FIG. 6 is a cutway view of the charging station with four action figures.

FIG. 6 shows a 3D CAD drawing depicting a wireless charging station 130 that is capable of charging up to four individual modified action figures 120 with a portion cutaway 140 to show the coil contained inside one charging well. The wireless charging station 130 is plugged into a household power outlet by utilizing a power cord 100. The wireless charging station 130 contains four individual wells that are set to a depth to nearly that of the action figure height. The drawing depicts that the four individual charging wells each contain a modified action figure 120. Each individual well contains a coil of wire that produces an alternating current that will be inductively coupled to a resonant coil within the action figure. Four individual LED's will indicate when the charging cycle is complete. When a charging cycle is complete, that specific well LED will illuminate to alert the user that that action figure is fully charged and ready for use.

Michael Faraday, was a brilliant, self taught English scientist who pioneered the field of electricity and magnetism. He was born on Sep., 22 1791, and died on Aug. 25, 1867. Faraday theorized that there was a link between electricity, magnetism, and light that was later proven by his friend James Clerk Maxwell. One famous physical law of Michael Faraday was his law of induction. Faraday's law of induction is a basic law of electromagnetism describing how a magnetic field will interact with an electric circuit to produce an electromotive force (EMF)—a phenomenon called electromagnetic induction. It is the fundamental operating principle of transformers, inductors, and many types of electrical motors, generators and solenoids. The wireless charging that is described by this invention operates by placing two coils of conducting wire in close proximity, where one coil (transmitting coil) is transmitting a time varying magnetic field, the other coil (passive receiving coil) will interact with the transmitted time varying magnetic field so as to induce an electromotive force in the conductive wires. The output of the passive receiving coil can then be rectified and filtered to produce a uniform DC (direct current) voltage that can be used to recharge the power source. There are many instances of wireless charging that exist today, a lot of Smartphone's have built in coils that are electromagnetically coupled to a charging (transmitting coil), by placing the Smartphone on a special pad. As the transmitting coil produces a time varying magnetic field, the passive receiving coil within the Smartphone, rectifies and filters the induced voltage to supply a DC voltage to recharge the internal battery. Although convenient, the process is far from efficient due to the fact that more power has to be transmitted, than is actually delivered to the Smartphone's battery. Additional examples include small hand held electronic devices and electric tooth brushes.

FIG. 7A shows an action figure 200 with a removable back pack snapped on 220, while FIG. 7B shows an action figure 200 with a removable back pack 210 shown in the unattached position. Due to the small size of the currently produced action figures, such as the ones manufactured by the LEGO corporation, space for adding electronics and temporary power storage is at a premium. Although it is possible that the electronic components can be custom manufactured that would fit inside the very limited amount of space within the action figure, the resulting cost would have to be passed onto the consumer, and the currently expensive LEGO action figures, would now cost around one-hundred to two-hundred dollars each. Another alternative would be to redesign the action figures so that the amount of space available within would be slightly increased, but this would require redesigning and re-tooling the molds currently used to produce the current action figures. This additional cost would also be passed along to the consumer, rendering then even more expensive than they are now. An embodiment of the disclosed patent allows for an alternative solution. By adding a removable "back pack" type accessory 210 to be snapped onto either an unmodified or modified action figure, the action figure can have new life with the features available within the back pack. When the electronics equipped back pack 210 is snapped onto an action figure 220, the result is a new level of interactivity that will breathe new life into the action figure. The described invention details two main paths for action figure interactivity, one method allows for a modified, rechargeable action figure to produce changes in facial expression, and possibly added electronics to allow for the integration of a wireless transceiver, such as a Bluetooth low energy device, and an three-axis electronic accelerometer and/or gyroscope. The other method allows for a electronics equipped, removable back pack that can be snapped onto either a modified action figure, or a non-modified action figure, and will allow either type (modified or unmodified) of action figure to experience a currently unknown degree of interactivity.

The electronics equipped back pack 210 can be snapped onto a currently available, "dumb" action figure, where the action figure itself does not contain anything electronic at all, or the electronics equipped back pack 210 can be snapped onto a modified action figure that is described in the disclosed invention.

Figure 8:
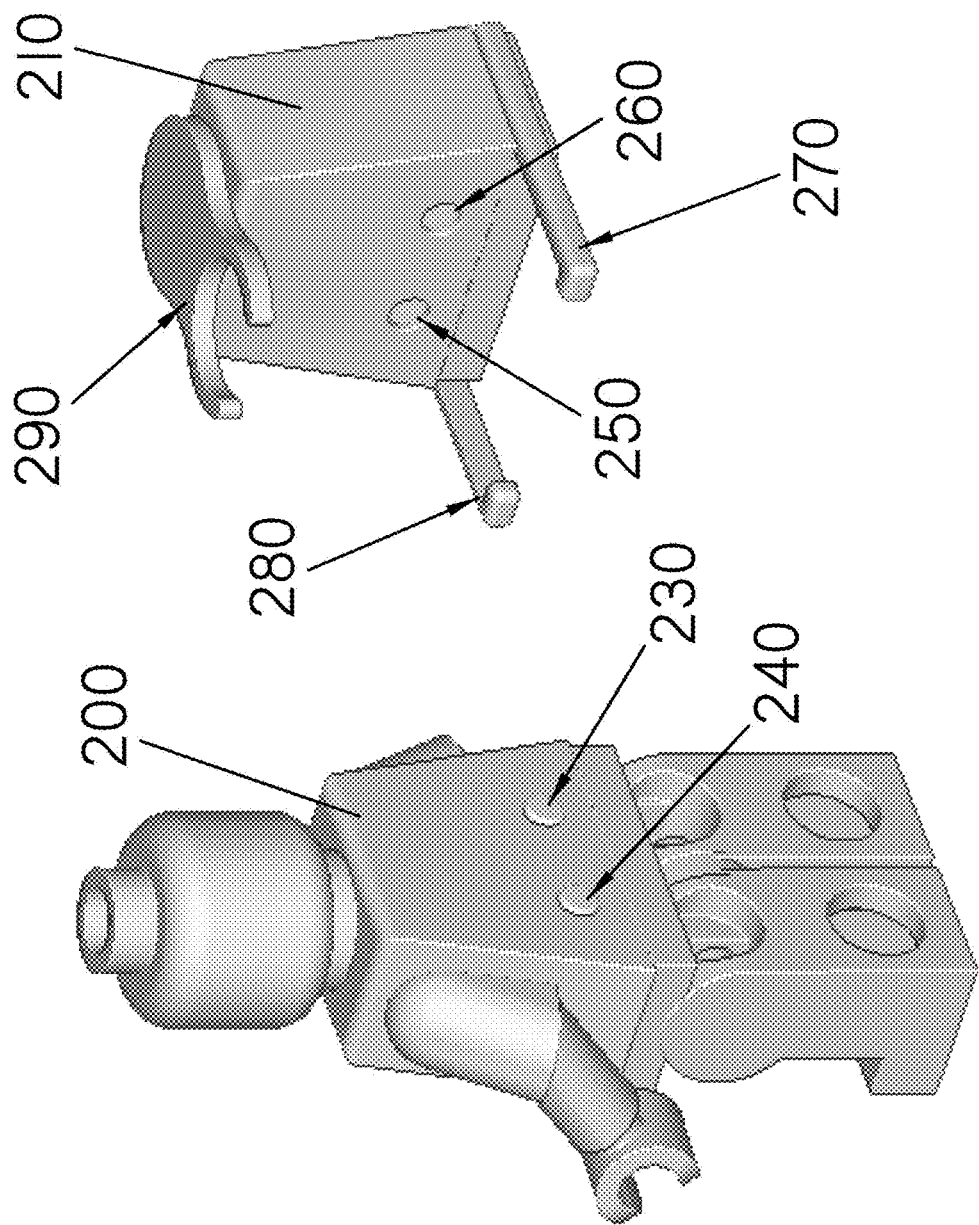
FIG. 8 is a perspective view of the modified action figure and a removed electronics backpack.

FIG. 8 shows a 3D CAD drawing depicting a modified action figure 200 and a electronics equipped, removable back pack 210 containing electronics and power. The modified action figure 200 contains two circular, electrically conductive contacts 230 and 240 that are used for the purposes of passing information back and forth from the modified action figure 200 and the electronics equipped, removable back pack 210. Within the electronics equipped, removable back pack, two matching circular, electrically conductive contacts 250 and 260 are used for the purposes of passing information back and forth from the modified action figure 200. In addition to passing information back and forth, the electrically equipped, removable back pack 210 can supply DC (direct current) power to a modified action figure. The benefit of this is that due to the extremely small size of the unmodified action figure, placing a power source inside would be very expensive, and inefficient, since any battery would also have to be extremely small. With current battery technology, such a small battery would have a very short span of time available to provide power. A larger battery, or rechargeable power source could be placed within the electronics equipped, removable back pack 210, since there is no need to allow for space for attaching the arms or the lower torso portion. Additionally, since there is no need for the electronics equipped, removable back pack 210, to mechanically support the movable arms and legs, the walls could be made thinner to allow more room inside for electronics components and a power source. The electronics equipped, removable back pack 210 can be attached to either a modified or unmodified action figure by two lower supports 270 and 280, as well as a neck attachment 290 that snaps onto an action figures head.

FIG. 9 shows a 3D CAD drawing depicting an embodiment of the disclosed invention, an electronics equipped, removable back pack. The back pack contains two matching circular, electrically conductive contacts 250 and 260 are used for the purposes of passing information back and forth from a modified action figure. The back pack has two holes 300 and 310 to allow the two matching circular, electrically conductive contacts 250 and 260 to protrude through the back pack. A small pc board 340 contains the electronics, as well as a rechargeable DC (direct current) power source 330 that will be used to supply power to the electronics within the back pack as well as to an attached, modified action figure. Since the power source 330 is housed inside the back pack, there is more room to place a larger power source than would be available to an unmodified action figure. Additionally, since there is no need for the electronics equipped, removable back pack 210, to mechanically support the movable arms and legs, the walls could be made thinner to allow more room inside for electronics components and a power source. The electronics equipped, removable back pack can be attached to either a modified or unmodified action figure by two lower supports 260 and 280, as well as a neck attachment 290 that snaps onto an action figures head. The neck attachment 290 snaps into a hole 320 within the back pack. The base of the back pack 350 snaps into the bottom portion of the back pack after the electronic components are installed.

FIG. 10 shows a drawing depicting how the orientation in three-dimensional space of a modified or unmodified action figure with a snap on electronics equipped back pack is translated into reciprocal orientations in a computer game. As the upper left action figure with back pack 400 is rotated in three-dimensional space, its orientation in three-dimensional space is mimicked by the actions of a virtual representation of the same action figure in a computer game, such as would be shown on TV 405 connected to an XBOX, Nintendo, or similar type gaming system. Depending on the type of interactive game, the response of the three-axis (X, Y, Z) orientation would have different results. If the child bought a LEGO Superman game, where the character fly's around a lot, the motion shown by the action figure 400 would translate into a flying LEGO Superman on the TV 405 connected to an XBOX, Nintendo, or similar type gaming system. If the child bought a LEGO game, where the character walks around a lot, the motion shown by slightly tilting the forward 410 would translate into a walking LEGO character on the TV 415 connected to an XBOX, Nintendo, or similar type gaming system.

Game systems such as XBOX, Nintendo, PlayStation, or similar type gaming system, rely on a main console, with one or more hand held game controllers with a plurality of buttons, and joystick like features, and a video output connected to a television, so the game can be displayed. For the described invention to work, the removable, electronics equipped back pack contains a minimum of an three-axis accelerometer and/or a three-axis gyroscope, a microcontroller to process the orientation information, a wireless Bluetooth interface to communicate the processed information to a wireless receiver, and a power source to supply power for the electronics. With modern surface mount electronics, and with higher integration of semiconductors, microcontrollers are available today with all of the mentioned components built in—except the power source.

FIG. 11 shows a drawing depicting more detail as to how the orientation in three-dimensional space of a modified or unmodified action figure with a snap on electronics equipped back 500 pack is translated into reciprocal orientations in a computer game. As the action figure with back pack 500 is rotated in three-dimensional space, its orientation in three-dimensional space is mimicked by the actions of a virtual representation of the same action figure in a computer game, such as would be shown on TV 540 connected by a wire 535 to an XBOX, Nintendo, PlayStation, or similar type gaming system. Depending on the type of interactive game, the response of the three-axis (X, Y, Z) orientation would have different results. If the child bought a LEGO Superman game, where the character fly's around a lot, the motion shown by the action figure 500 would translate into a flying LEGO Superman on the TV 540 connected to an XBOX, Nintendo, or similar type gaming system. If the child bought a LEGO game, where the character walks around a lot, the motion shown by slightly tilting the forward would translate into a walking LEGO character on the TV connected to an XBOX, Nintendo, or similar type gaming system.

Game systems such as XBOX, Nintendo, PlayStation, or similar type gaming system, rely on a main console 530, with one or more hand held game controllers with a plurality of buttons, and joystick like features, and a video output connected to a television, so the game can be displayed. For the described invention to work, the removable, electronics equipped back pack contains a minimum of an three-axis accelerometer and/or a three-axis gyroscope, a microcontroller to process the orientation information, a wireless Bluetooth interface to communicate the processed information to a wireless receiver, and a power source to supply power for the electronics. With modern surface mount electronics, and with higher integration of semiconductors, microcontrollers are available today with all of the mentioned components built in—except the power source. The widely used Arduino-101 board is built around the Intel® Curie™ module which is an advanced device based on the Intel® Quark™ SE microcontroller C1000 processor core. The Intel® Curie™ module provides a low-power solution equipped with compute, motion sensors, Bluetooth® low energy, battery-charging, and pattern matching capabilities for optimized analysis of sensor data, enabling quick and easy identification of actions and motions. The module is packaged into a very small form factor and runs a new software platform created specifically for the Intel® Curie™ module. Instead of having a microcontroller chip, memory chip, a Bluetooth® low energy communication chip, and a six-axis motion sensing chip (one three-axis accelerometer and one three-axis gyroscope), only one Intel® Curie™ module is needed. Because only one small surface mount chip is required in place of four separate surface mount chips, an integrated system can be placed within the replaceable, back pack. All that is additionally required, is a few miscellaneous surface mount resistors and capacitors, a power source, and a Bluetooth® low energy antenna (which is simply a length of pc board traces of the proper shape.) The power source need not be a permanent source like a small, replaceable battery, but it could be a small Super Capacitor or a small rechargeable battery. Any small power source that is replaceable is detrimental, due to the fact that additional back pack real estate would be required to hold it, and also the fact that a child may accidentally swallow the tiny power source, which could cause choking or medical complications. When the power supply is charged, there is power available to operate the microprocessor module (which includes the microcontroller, memory, Bluetooth® low energy communication module, and the six-axis motion sensing chip). One of the XBOX, Nintendo, PlayStation, or similar type gaming system hand held controllers is replaced with a proprietary wireless interface that plugs into the gaming system instead of the controller. The wireless interface game controller 520 also contains a microcontroller and a Bluetooth® low energy communication interface that communicates with the Bluetooth® low energy communication module contained within the replaceable, electronics equipped back pack. Based upon the type of specific gaming system used, the wireless interface game controller 520 will be powered by its own batteries or if power is available from one of the game controller's pins, power will be drawn from the game controller 530.

It is the wireless communication between the action figures replaceable, electronics equipped back pack and the gaming systems wireless interface game controller 520 connected to the gaming system 530 that is responsible for translating the three-dimensional orientation information between the two. As the action figure connected to the replaceable, electronics equipped back pack 500 changes it orientation is three-dimensional space, the electronics contained within the replaceable, electronics equipped back pack, the microcontroller reads in the multi-axis orientation sensor information, and reports this information to the Bluetooth® low energy communication module. The transmitted wireless information 505 is then wirelessly read in 510 by the gaming systems wireless interface game controller 520 connected to the gaming system 530. The gaming systems wireless interface game controller 520 that is physically connected by a wire 525 in place of one of the handheld game controllers, the orientation changes of the action figure connected to the replaceable, electronics equipped back pack are translated into the same manner as if the joystick like pad of the handheld game controller 520 were being manipulated.

Figure 12:
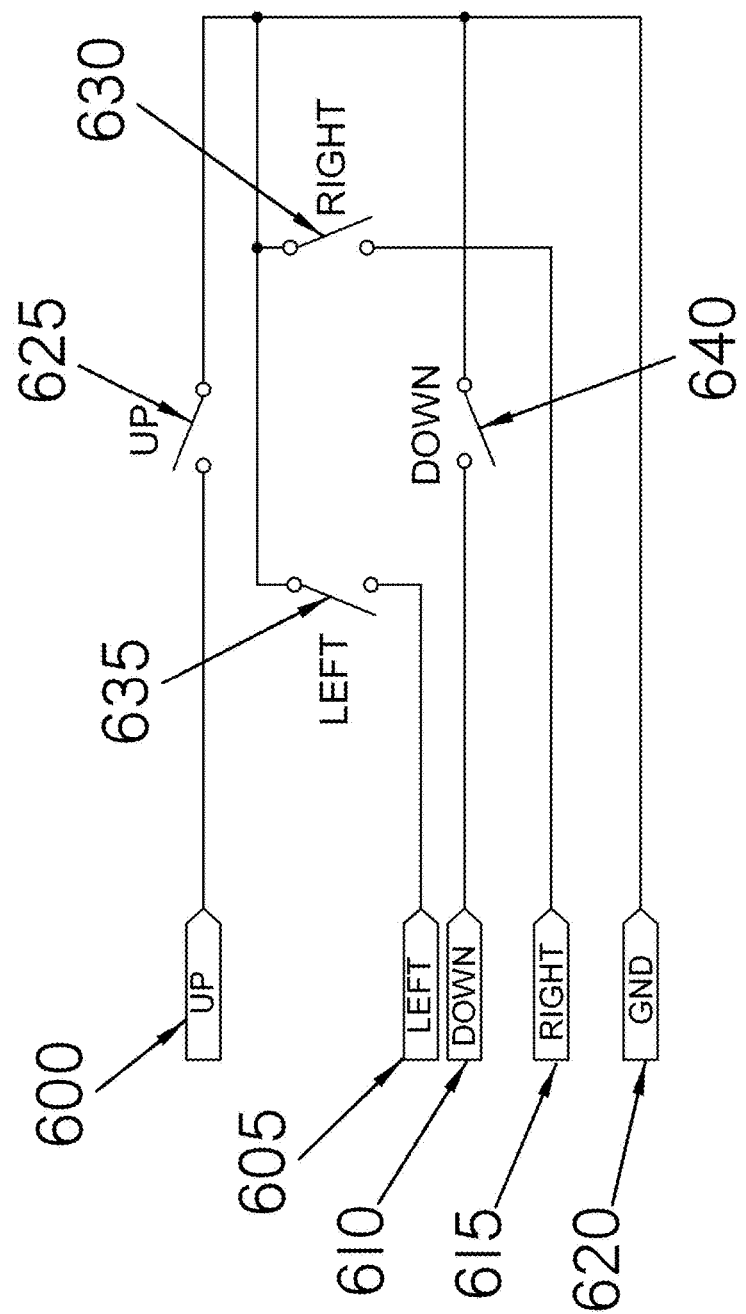
FIG. 12 is a schematic diagram of a game consoles handheld game controller.

FIG. 12 shows a schematic drawing that depicts a handheld game controller as would be used on a game console such as an XBOX, Nintendo, PlayStation, or other similar game console. On different game consoles, there may be two main controls that move characters around on the screen, a joystick, and a D-pad, or directional pad, which looks like a large plastic "plus" sign. This D-pad allows one specific type of movement. While the joystick allows another specific type of movement. The handheld game controller usually contains both a D-pad and a joystick. For the D-pad emulation, the wireless handheld game controller interface will connect in place on the normal handheld game controller. During normal D-pad operation, the D-pad allows for an up, down, right, and left motion by pressing the D-pad near the top, bottom, right side, or left side respectively. As the top portion of the D-pad is pressed, a corresponding "up" switch is closed 625. The corresponding switch closing has the effect of placing the signal that is correlated to the "up" position 600 is coupled to ground 620, which tells the game controller that it should perform a specific action as dictated by the software. As the bottom portion of the D-pad is pressed, a corresponding "bottom" switch is closed 640. The corresponding switch closing has the effect of placing the signal that is correlated to the "bottom" position 610 is coupled to ground 620, which tells the game controller that it should perform a specific action as dictated by the software. As the left portion of the D-pad is pressed, a corresponding "left" switch is closed 635. The corresponding switch closing has the effect of placing the signal that is correlated to the "left" position 605 is coupled to ground 620, which tells the game controller that it should perform a specific action as dictated by the software. As the right portion of the D-pad is pressed, a corresponding "right" switch is closed 630. The corresponding switch closing has the effect of placing the signal that is correlated to the "right" position 610 is coupled to ground 620, which tells the game controller that it should perform a specific action as dictated by the software.

Figure 13:
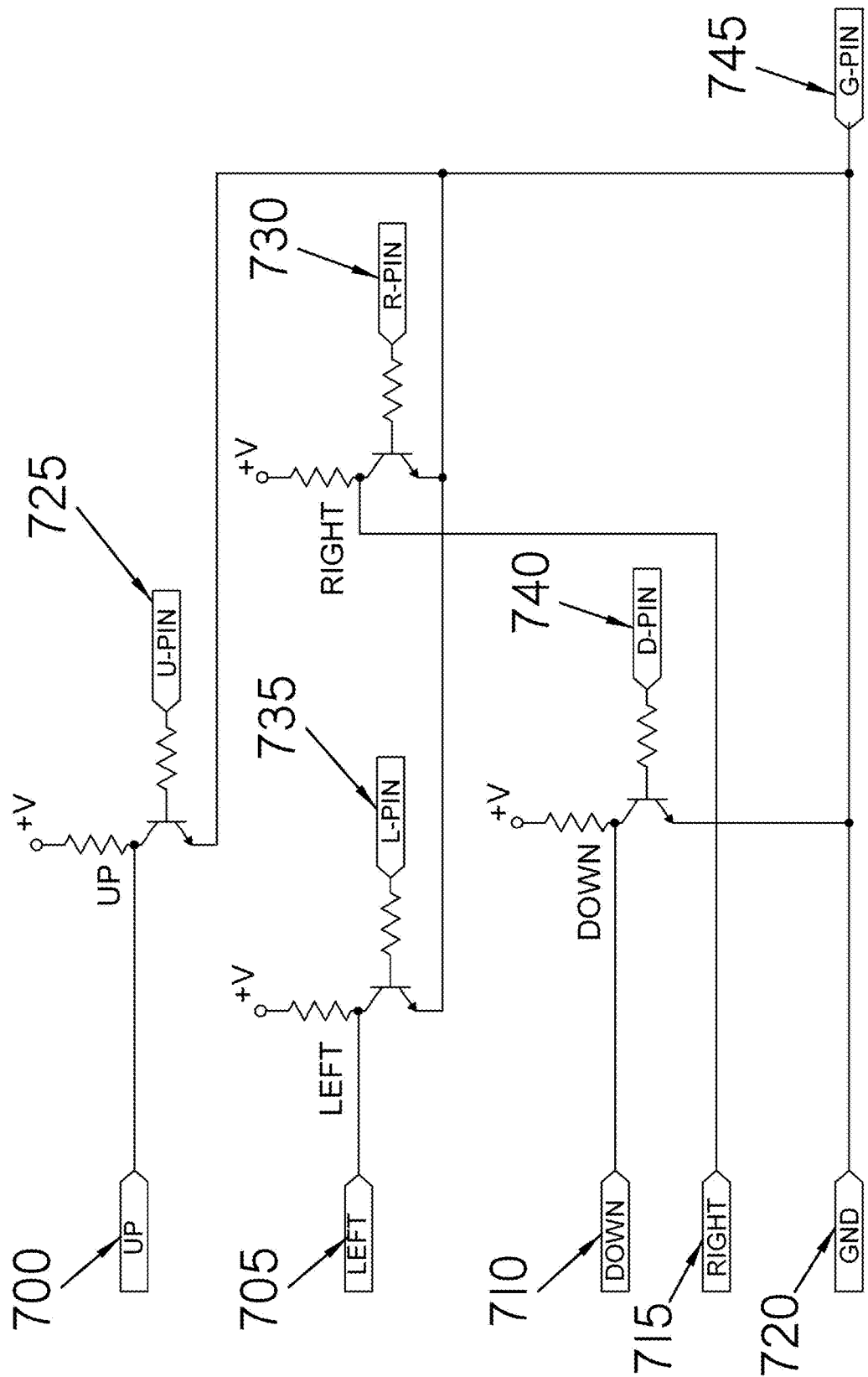
FIG. 13 is a schematic diagram of a game consoles handheld game controllers interface to a microcontroller.

FIG. 13 shows a schematic drawing that depicts a portion of an embodiment of the disclosed invention, of a wireless interface that mimics a handheld game controller as would be used on a game console such as an XBOX, Nintendo, PlayStation, or other similar game console. On different game consoles, there may be two main controls that move characters around on the screen, a joystick, and a D-pad, or directional pad, which looks like a large plastic "plus" sign. This D-pad allows one specific type of movement. While the joystick allows another specific type of movement. The handheld game controller usually contains both a D-pad and a joystick. For the D-pad emulation, the wireless handheld game controller interface will connect in place on the normal handheld game controller. During normal D-pad operation, the D-pad allows for an up, down, right, and left motion by pressing the D-pad near the top, bottom, right side, or left side respectively. Since the modified action figures actions will be used to represent the D-pad section of the controller, when the action figure is tilted forward, the orientation in three-dimensional space is determined, and this information is transmitted wirelessly to the wireless game controller interface. When the information is received by the wireless game controller interface plugged into one of the game consoles inputs, the microcontroller determines that the forward leaning motion of the modified action figure corresponds to an action that would mimic a person physically pressing the "up" switch on the D-pad. Because there is no need to physically press a button, the microcontroller sends a voltage corresponding to a high level logic signal to the "U-Pin" 725, which turns on the transistor, or other similar device and couples the game controllers "up" 700 pin close to ground level, indicating to the game controller that the "up" portion of the D-pad has been pushed.

When the action figure is tilted backward, the orientation in three-dimensional space is determined, and this information is transmitted wirelessly to the wireless game controller interface. When the information is received by the wireless game controller interface plugged into one of the game consoles inputs, the microcontroller determines that the backward leaning motion of the modified action figure corresponds to an action that would mimic a person physically pressing the "down" switch on the D-pad. Because there is no need to physically press a button, the microcontroller sends a voltage corresponding to a high level logic signal to the "D-Pin" 740, which turns on the transistor, or other similar device and couples the game controllers "down" 710 pin close to ground level, indicating to the game controller that the "down" portion of the D-pad has been pushed.

When the action figure is tilted toward the left, the orientation in three-dimensional space is determined, and this information is transmitted wirelessly to the wireless game controller interface. When the information is received by the wireless game controller interface plugged into one of the game consoles inputs, the microcontroller determines that the left leaning motion of the modified action figure corresponds to an action that would mimic a person physically pressing the "left" switch on the D-pad. Because there is no need to physically press a button, the microcontroller sends a voltage corresponding to a high level logic signal to the "L-Pin" 735, which turns on the transistor, or other similar device and couples the game controllers "left" 705 pin close to ground level, indicating to the game controller that the "left" portion of the D-pad has been pushed.

When the action figure is tilted toward the right, the orientation in three-dimensional space is determined, and this information is transmitted wirelessly to the wireless game controller interface. When the information is received by the wireless game controller interface plugged into one of the game consoles inputs, the microcontroller determines that the right leaning motion of the modified action figure corresponds to an action that would mimic a person physically pressing the "right" switch on the D-pad. Because there is no need to physically press a button, the microcontroller sends a voltage corresponding to a high level logic signal to the "R-Pin" 730, which turns on the transistor, or other similar device and couples the game controllers "right" 715 pin close to ground level, indicating to the game controller that the "right" portion of the D-pad has been pushed.

It should be understood that although only discrete orientations were described, it is more likely that combinations of orientations will be encountered, such as the modified action figure leaning forward and left at the same time, or backward and right at the same time. Many combinations are possible. In the case of multiple orientations of the modified action figure being reported wirelessly to the game controllers handheld game controller interface, the microcontroller will respond by activating multiple orientations simultaneously, such as both the "U-Pin" 725 and "L-Pin" 735 simultaneously, or the "D-Pin" 740 and "R-Pin" 730 simultaneously. It should be noted however, that not every combination of orientation is valid. For example, the "U-Pin" 725 and the "D-Pin" 740 could never be activated simultaneously, since on the physical D-Pad control, a person could not press both "up" and "down" at the same time. The same reasoning goes for right and left.

Figure 14:
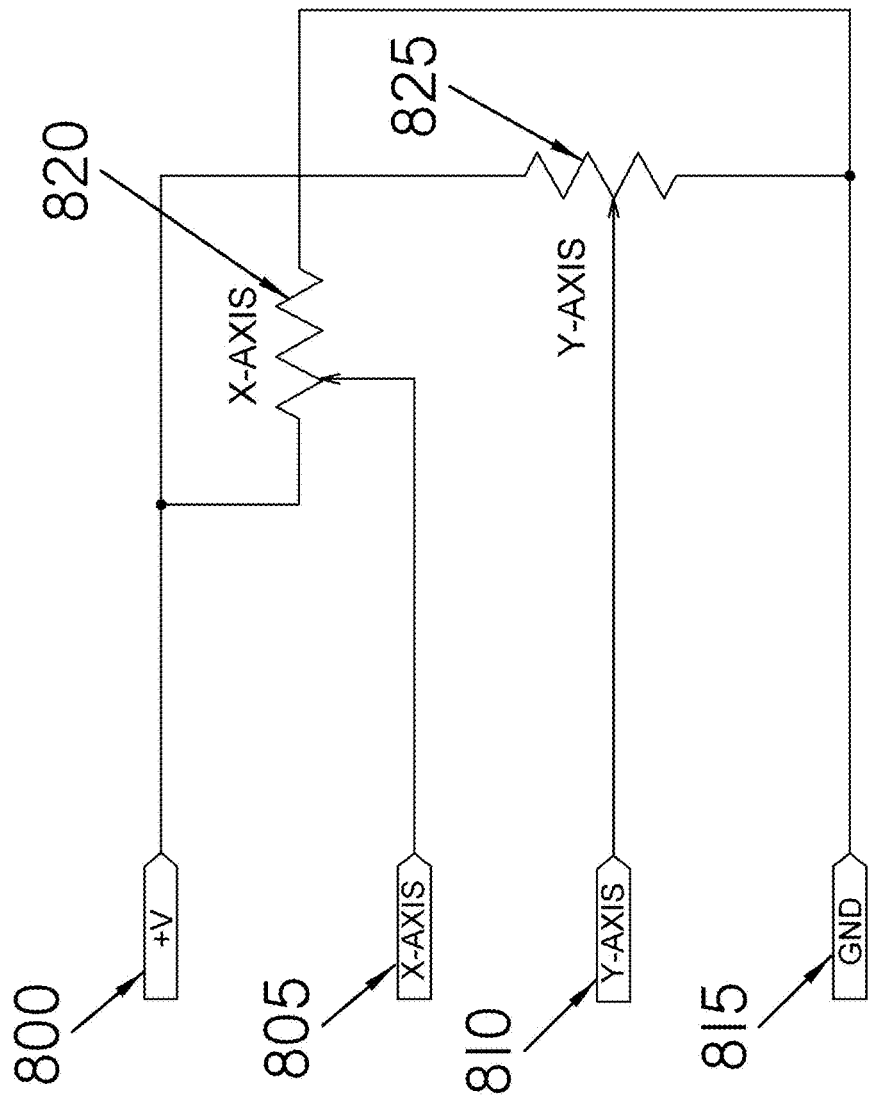
FIG. 14 is a schematic diagram of a game consoles handheld joystick game controller.

FIG. 14 shows a schematic drawing that depicts a handheld game controller as would be used on a game console such as an XBOX, Nintendo, PlayStation, or other similar game console. On different game consoles, there are may be two main controls that move characters around on the screen, a joystick, and a D-pad, or directional pad, which looks like a large plastic "plus" sign. This D-pad allows one specific type of movement. The joystick is a small stick or ball that can move in a circular direction, and can give a smoother degree of control to a video game. For the joystick emulation, the wireless handheld game controller interface will connect in place on the normal handheld game controller. During normal joystick operation, the joystick allows for a smooth forward, backward, left, and right motion by gently pushing a small stick or ball in a forward, right, left, or backward motion fro a center point. While in the center point, the joystick is telling the game consoles software to remain in the current location, and as the joystick is gently pushed away from the center point, a character or object will respond accordingly. The main difference between the D-Pad and the joystick, is that the D-Pad is strictly on or off, while the joystick can give a proportional response, of being a little on, more on, or all the way on, as an increasing voltage. This feature is useful in different games, as the speed of a character or object can increase in a specific direction by gently pushing the joystick to a greater amount away from the center point.

The joystick control consists of two potentiometers, one to control the X-axis 820 and another to control the Y-axis 825. The joystick is connected to both potentiometers in such a way that as the joystick is moved forward and backward only, it does not affect the X-axis potentiometer 820. And as the joystick is moved left and right only, it does not affect the Y-axis potentiometer 825. If, however; the joystick is moved slightly forward and slightly left or right, the two potentiometers are affected since they a coupled together.

A common voltage 800 is supplied to each potentiometer in the joystick, as well as a common ground 815. When the joystick is moved in a strictly left and right motion, the wiper of the X-axis 820 potentiometer is changed, and a corresponding greater or lesser voltage is sent to the X-Axis pin

805 of the game controller. When the joystick is moved in a strictly forward and backward motion, the wiper of the Y-axis 825 potentiometer is changed, and a corresponding greater or lesser voltage is sent to the Y-Axis pin 810 of the game controller. As with the D-pad control, a combination of motions can be realized by the joystick, where the X-axis and Y-axis motions can be combined.

Figure 15:
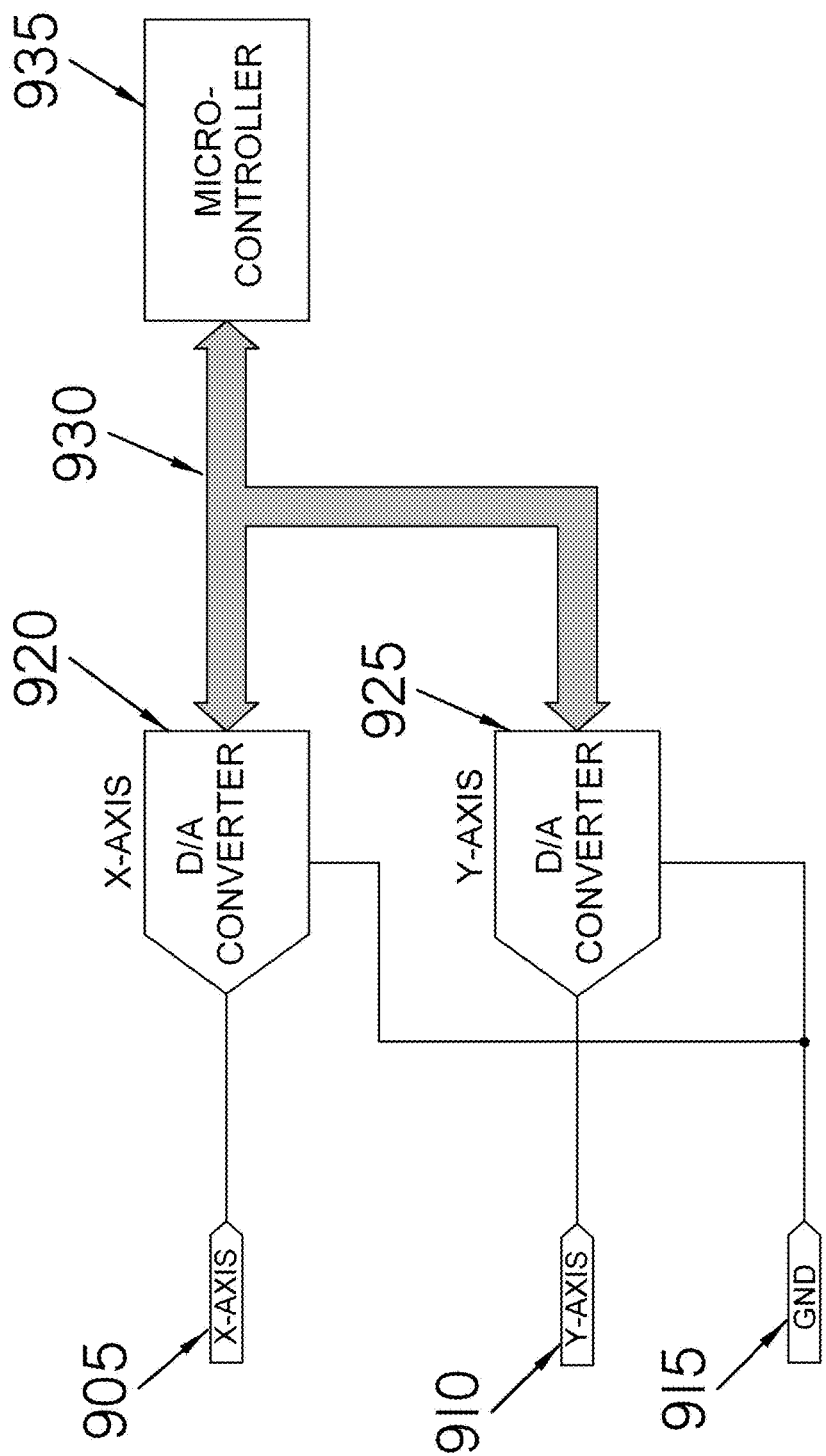
FIG. 15 is a schematic diagram of a game consoles handheld joystick game controllers interface to two digital to analog converters and a microcontroller.

FIG. 15 shows a schematic drawing that depicts a portion of an embodiment of the disclosed invention, of a wireless interface that mimics a handheld game controller as would be used on a game console such as an XBOX, Nintendo, PlayStation, or other similar game console. On different game consoles, there may be two main controls that move characters around on the screen, a joystick, and a D-pad, or directional pad, which looks like a large plastic "plus" sign. This D-pad allows one specific type of movement. While the joystick allows another specific type of movement. The joystick is a small stick or ball that can move in a circular direction, and can give a smoother degree of control to a video game. For the joystick emulation, the wireless handheld game controller interface will connect in place on the normal handheld game controller. During normal joystick operation, the joystick allows for a smooth forward, backward, left, and right motion by gently pushing a small stick or ball in a forward, right, left, or backward motion fro a center point. While in the center point, the joystick is telling the game consoles software to remain in the current location, and as the joystick is gently pushed away from the center point, a character or object will respond accordingly. The main difference between the D-Pad and the joystick, is that the D-Pad is strictly on or off, while the joystick can give a proportional response, of being a little on, more on, or all the way on, as an increasing voltage. This feature is useful in different games, as the speed of a character or object can increase in a specific direction by gently pushing the joystick to a greater amount away from the center point. To emulate the two potentiometers commonly found in joystick controls on game controllers, the described inventions wireless game controllers handheld interface utilizes two digital to analog converters, one to control the X-axis 920 and another to control the Y-axis 925. A common ground is connected to each digital to analog converter.

In one instance, when the modified action figure is tilted toward the right, the orientation in three-dimensional space is determined, and this information is transmitted wirelessly to the wireless game controller interface physically connected to the game controller in place of one of the handheld game controllers. When the information is received by the wireless game controller interface plugged into one of the game consoles inputs, the microcontroller determines that the right leaning motion of the modified action figure corresponds to an action that would mimic a person physically moving the joystick to the right. Because the modified action figure contains a three-axis gyroscope, the angle of the lean to the right can be mimicked by the digital to analog converter. The degree of lean toward the right can be determined from the output of the three-axis gyroscope by utilizing the microcontroller within the back pack of the modified action figure to map a voltage level to a known orientation in three dimensional space. This information is then wirelessly transmitted to the wireless game controller interface plugged into one of the game consoles inputs. As an example, if the modified action figure with the electronics equipped back pack is indicating that the action figure is leaning forty-five degrees to the right, then the X-Axis 920 digital to analog controller will produce a corresponding voltage equal to that of what the potentiometer would produce from the physical joystick control and supply this voltage to the X-Axis pin 905 connected to the game controller. The rate that the modified action figure with the electronics equipped back pack is angled to a forty-five degree angle to the right would require the information from the three-axis accelerometer. A slow lean to the right would produce a small voltage compared to a rapid lean to the right, which would produce a larger voltage. The information from these two components (three-axis gyroscope and three-axis accelerometer) would be transmitted wirelessly to the wireless game controller interface plugged into one of the game consoles inputs. The rate at which the X-Axis digital to analog converters 925 output ramps up to the voltage level corresponding to a forty-five degree lean to the right, would mimic the actions of a person physically moving the joystick control slowly at forty-five degrees slowly, or quickly. The final voltage reached that corresponds to forty-five degrees will be reached in both instances, only the rate at which the final voltage is reached is different.

This same logic applies to leaning the modified action figure to the left, forward, or backward. The combination of the two digital to analog converters can combine to mimic the angle of the modified action figures orientation in three-dimensional space.

Figure 16:
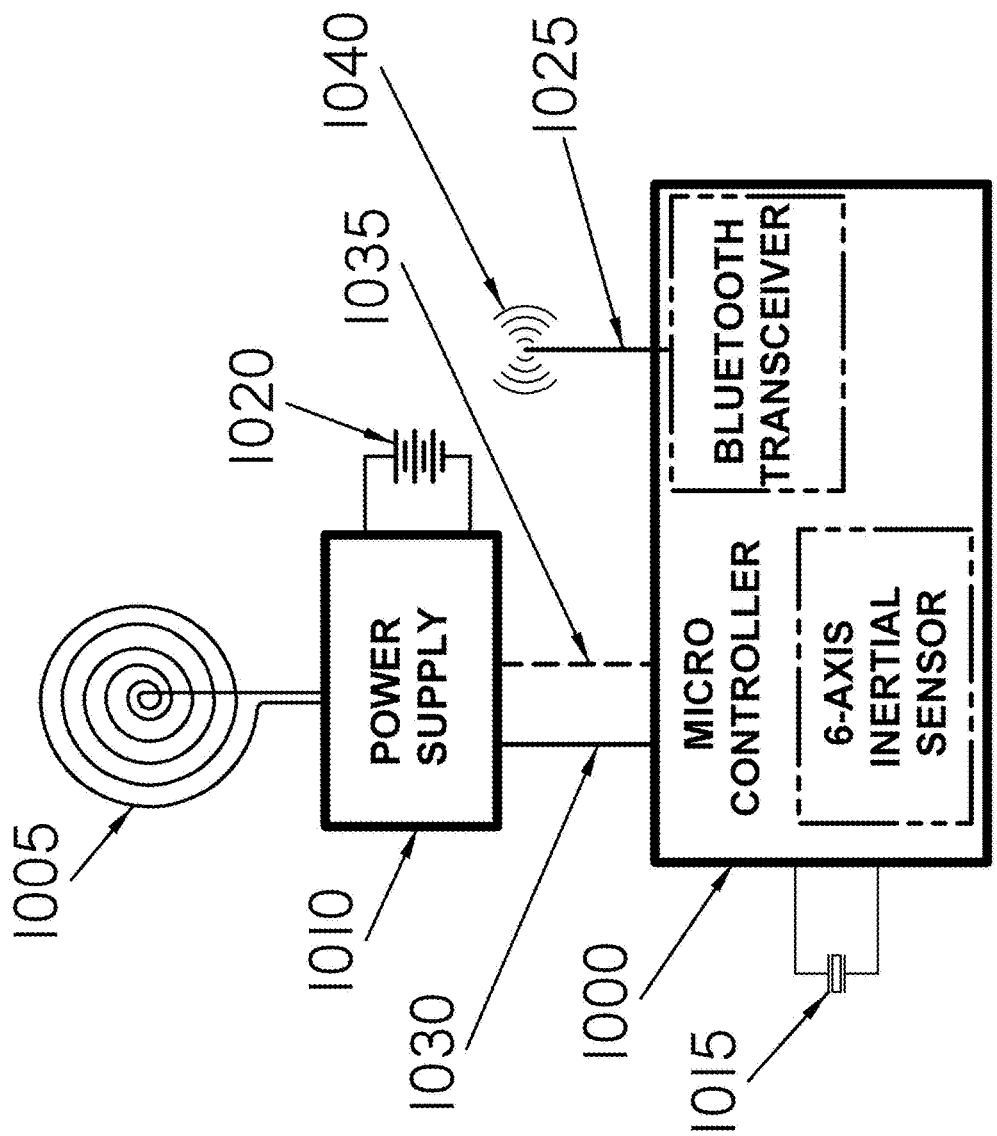
FIG. 16 is a schematic depiction of a self contained interaction assembly that would be integrated into a removable, electronics embedded back pack, or within a larger accessory such as a toy space ship.

FIG. 16 shows a block diagram that depicts an embodiment of the described invention detailing a self contained interaction assembly that would be integrated into a removable, electronics embedded back pack, or within a larger accessory such as a space ship. The main problem with trying to make a small action figure interactive, such as those manufactured by the LEGO Corporation, is the size limitation. The current LEGO action figures are smaller than a AAA battery. Supplying sufficient power is a problem, as well as cramming the necessary electronics into such a confined space. By utilizing a microcontroller 1000 that contains a plurality of integrated internal subsystems, the small space requirements can now be dealt with. With modern surface mount electronics, and with higher integration of semiconductors, microcontrollers are available today with all of the mentioned components built in—except the power source. The widely used Arduino-101 board is built around the Intel® Curie™ module which is an advanced device based on the Intel® Quark™ SE microcontroller C1000 processor core. The Intel® Curie™ module provides a low-power solution equipped with compute, motion sensors, Bluetooth® low energy, battery-charging, and pattern matching capabilities for optimized analysis of sensor data, enabling quick and easy identification of actions and motions. The module is packaged into a very small form factor and runs a new software platform created specifically for the Intel® Curie™ module. Instead of having a microcontroller chip, memory chip, a Bluetooth® low energy communication chip, and a six-axis motion sensing chip (one three-axis accelerometer and one three-axis gyroscope), only one Intel® Curie™ module is needed. Because only one small surface mount chip is required in place of four separate surface mount chips, an integrated system can be placed within the replaceable, back pack. All that is additionally required, is a few miscellaneous surface mount resistors and capacitors, a power supply 1010, and a Bluetooth® low energy antenna 1025 (which is simply a length of pc board traces of the proper shape.) The power supply 1010 would need a temporary storage source like a small, rechargeable battery 1020, but it could also be a small Super Capacitor. Any small power source that is replaceable is detrimental, due to the fact that additional back pack real estate would be required to hold it, and also the fact that a child may accidentally swallow the tiny power source, which could cause choking or medical complications. It is important to point out that although the disclosed invention described a removable, electronics equipped back pack that contains a small pc board and power source, it is also feasible that the small pc board and power source, can be "potted" into a small mold with epoxy resin. The advantage of this is that the epoxy can take the final form of the removable electronics back pack, and there can be a little more room for small pc board and power source. With a slightly larger temporary power source 1020, the run time will increase. To recharge the self contained system, a resonant coil 1005 is connected to the power supply 1010 where wirelessly energy is transmitted from an external power source that has a similar resonant coil. The power supply 1010 contains electronics that convert the alternating voltage received from its resonant coil 1005, from the external power sources resonant coil, to a DC (direct current) voltage, that will be used to recharge the temporary power source. When the self contained, removable electronics back pack is removed from its close proximity of the charging resonant coil, the temporary power source 1020, being fully charged, will supply power to the electronics through the power supply 1010. The power supply 1010 is connected to the microcontroller 1000 by a positive 1030 and a ground 1035 supply connection. The Bluetooth® low energy communication chip is connected to a small length of pc board metal trace that serves as an antenna 1025. The antenna 1025 can transmit and receive wireless information 1040 characteristic of the Bluetooth® low energy communication protocol. When the small action figure equipped with the removable electronics back pack is positioned in three-dimensional space, the inertial sensor within the microcontroller 1000 will transmit this information wirelessly to the wireless game controller interface plugged into one of the game consoles inputs 520.

Figure 17:
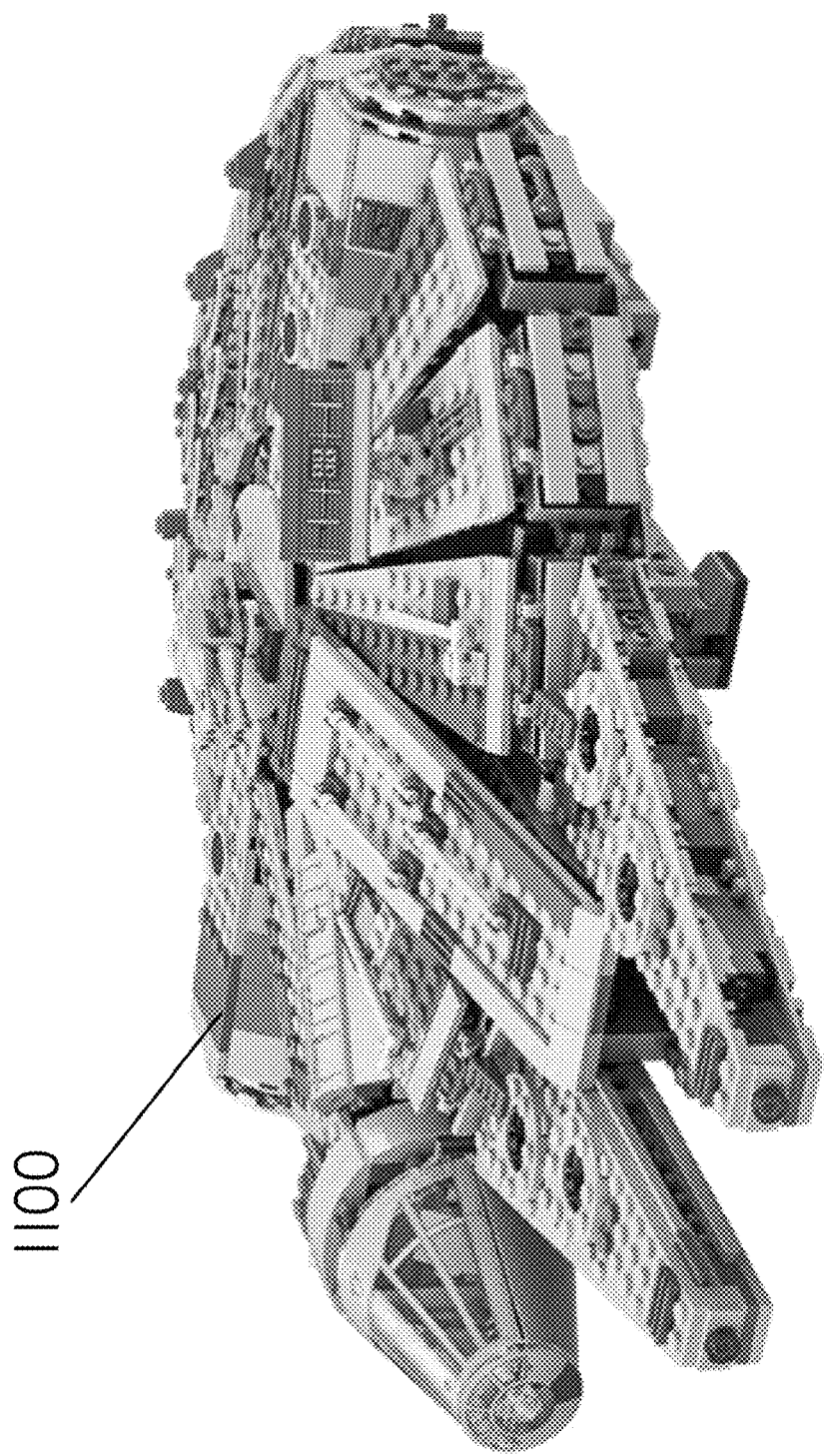
FIG. 17 is a perspective view of a commercially available space ship.

FIG. 17 depicts a picture of a commercially available accessory, in the form of a Star Wars space ship called the "Millennium Falcon" 1100 manufactured by the LEGO Corporation. The described invention would integrate with a toy such as the Millennium Falcon so it would become interactive with a video game. By constructing a slightly larger "back pack", which would also contain a larger, longer lasting power source, the accessory called the "Millennium Falcon" be made interactive with a video game. With a larger accessory, the inertial information from the microcontroller need not be the only information sent to a wireless game controller interface plugged into one of the game consoles inputs 520. In addition to the three-dimensional information, the microcontroller would also have four of its inputs connected to buttons that would be found on a handheld game controllers D-pack buttons. The advantage here is that the "Millennium Falcon" accessory equipped with the slightly larger electronics found in the removable electronics back pack, would also have four buttons as arranged in the handheld controllers D-pack control, so that the accessory ("Millennium Falcon") has now become a handheld controller, but without the cord, since it is wireless. If a child were playing a Star Wars based video game where they were flying a virtual representation of the Millennium Falcon, then instead of controlling it with a handheld controller physically connected to the game controller, the wireless information sent from the described invention would be used in conjunction with the wireless game controller interface plugged into one of the game consoles inputs 520. The child could physically move the accessory (Millennium Falcon) around in three-dimensional space as if it were flying, while its physical orientation in three-dimensional space would behave as if it were a game controller. With the previously described removable electronics equipped back pack snapped onto a small action figure, a problem could occur due to confusion between a mode of operation between the joystick emulation and the D-pack emulation. To overcome this possible confusion, the wireless game controller interface plugged into one of the game consoles inputs 520 would contain a switch that would indicate to the game console that the information being sent to the game controller is emulating the four individual swathes of a D-pack control or the variable voltage signal of a joystick control. In cases where the joystick control is normally used on the handheld game controller connected to the game console, the switch would be in the "joystick" position, indicating to the microcontroller that the information received wirelessly form the small action figure connected to the removable electronics equipped back pack, would be emulated as if it were a physical joystick connected to the game console. In cases where the D-pack control is normally used on the handheld game controller connected to the game console, the switch would be in the "D-pack" position, indicating to the microcontroller that the information received wirelessly form the small action figure connected to the removable electronics equipped back pack, would be emulated as if it were a physical D-pack control connected to the game console. With the larger amount of space available to larger accessory's, such as the Millennium Falcon, the inertial information transmitted to the wireless game controller interface plugged into one of the game consoles inputs 520 would be switched to a third "multi" option, where the wireless information received is from a joystick emulation and if any of the four physical switches of the D-pack control added to the accessory are pressed, the wireless game controller interface plugged into one of the game consoles inputs 520 would emulated as if each of the four D-pack switches were physically connected to the game console.

Figure 18:
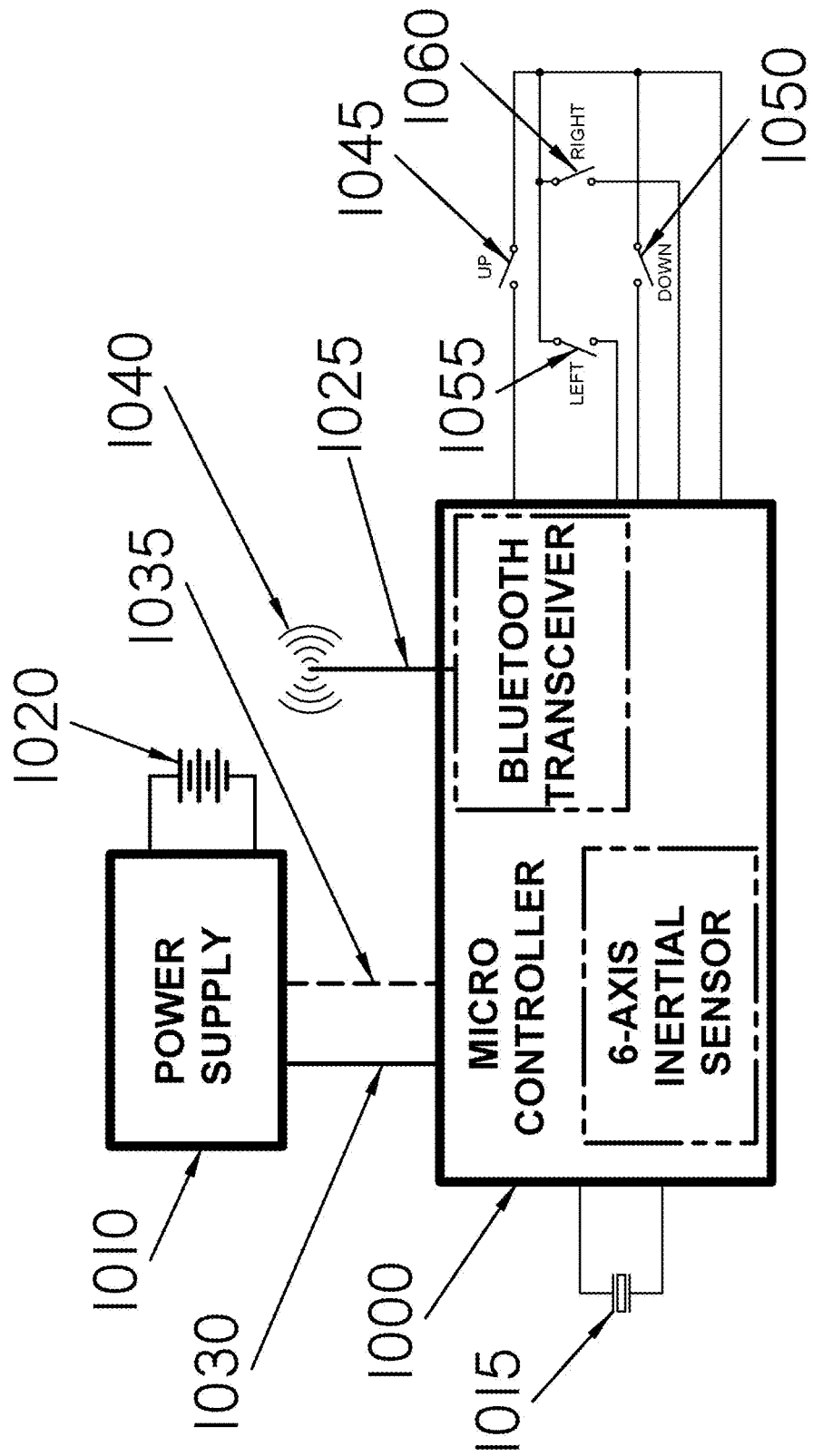
FIG. 18 is a schematic of a self contained interaction assembly that would be integrated into a removable, electronics embedded back pack, or within a larger accessory such as a space ship.

FIG. 18 shows a block diagram that depicts an embodiment of the described invention detailing a self contained interaction assembly that would be integrated into a removable, electronics embedded back pack, or within a larger accessory such as a space ship. By utilizing a microcontroller 1000 that contains a plurality of integrated internal subsystems, the small space requirements can now be dealt with. As stated previously, the Intel® Curie™ module provides a low-power solution equipped with compute, motion sensors, Bluetooth® low energy, battery-charging, and pattern matching capabilities for optimized analysis of sensor data, enabling quick and easy identification of actions and motions. The module is packaged into a very small form factor and runs a new software platform created specifically for the Intel® Curie™ module. Instead of having a microcontroller chip, memory chip, a Bluetooth® low energy communication chip, and a six-axis motion sensing chip (one three-axis accelerometer and one three-axis gyroscope), only one Intel® Curie™ module is needed. Because only one small surface mount chip is required in place of four separate surface mount chips, an integrated system can be placed within the replaceable, back pack. All that is additionally required, is a few miscellaneous surface mount resistors and capacitors, a power supply 1010, and a Bluetooth® low energy antenna 1025 (which is simply a length of pc board traces of the proper shape.) Unlike the removable, electronics equipped action figure back pack, where the small space is very constrictive, an accessory based wireless interface system can be larger, affording the use of nonrechargeable, replaceable batteries. The power supply 1010 would need a temporary storage source like a small battery 1020. The power supply 1010 is connected to the microcontroller 1000 by a positive 1030 and a ground 1035 supply connection. The Bluetooth® low energy communication chip is connected to a small length of pc board metal trace that serves as an antenna 1025. The antenna 1025 can transmit and receive wireless information 1040 characteristic of the Bluetooth® low energy communication protocol. When the accessory equipped with the removable electronics emulation circuit is positioned in three-dimensional space, the inertial sensor within the microcontroller 1000 will transmit this information wirelessly to the wireless game controller interface plugged into one of the game consoles inputs 520. In addition to transmitting variable, X-Axis, Y-Axis information to emulate the joystick operation, there are four switches that are used to emulate the D-pack control that is commonly found on handheld controllers connected to game consoles. During normal D-pad operation, the D-pad allows for an up, down, right, and left motion by pressing the D-pad near the top, bottom, right side, or left side respectively. As the top portion of the D-pad is pressed, a corresponding "up" switch is closed 1045. The corresponding switch closing has the effect of placing the signal that is correlated to the "up" position is coupled to common or ground, which tells the game controller that it should perform a specific action as dictated by the software. As the bottom portion of the D-pad is pressed, a corresponding "bottom" switch is closed 1050. The corresponding switch closing has the effect of placing the signal that is correlated to the "bottom" position is coupled to common or ground, which tells the game controller that it should perform a specific action as dictated by the software. As the left portion of the D-pad is pressed, a corresponding "left" switch is closed 1055. The corresponding switch closing has the effect of placing the signal that is correlated to the "left" position is coupled to common or ground, which tells the game controller that it should perform a specific action as dictated by the software. As the right portion of the D-pad is pressed, a corresponding "right" switch is closed 1060. The corresponding switch closing has the effect of placing the signal that is correlated to the "right" position is coupled to common or ground, which tells the game controller that it should perform a specific action as dictated by the software. The advantage to this setup is that the three-dimensional orientation can be transmitted wirelessly to the wireless game controller interface plugged into one of the game consoles inputs 520 while simultaneously transmitting the state of each of the four switches, emulating the D-pack control when they are pressed by the user. When a Star Wars Millennium Falcon is used as the wireless controller, the Millennium Falcon can now become the controller, as if it were the handheld game controller, physically connected to the game console. A small out of balance motor can also be added to the circuit to provide tactile feedback from the game that the accessory such as the virtual representation of the Millennium Falcon was "hit" by an asteroid or laser cannon.

REFERENCE NUMERALS

FIG. 1:
1 Three-Dimensional CAD drawing depicting the main torso section of an action figure, such as manufactured by the Lego Corporation.
2 Three-Dimensional CAD drawing depicting the right arm section of an action figure, such as manufactured by the Lego Corporation.
3 Three-Dimensional CAD drawing depicting the left arm section of an action figure, such as manufactured by the Lego Corporation.
4 Three-Dimensional CAD drawing depicting the right hand section of an action figure, such as manufactured by the Lego Corporation.
5 Three-Dimensional CAD drawing depicting the left hand section of an action figure, such as manufactured by the Lego Corporation.
6 Three-Dimensional CAD drawing depicting the right leg section of an action figure, such as manufactured by the Lego Corporation.
7 Three-Dimensional CAD drawing depicting the left leg section of an action figure, such as manufactured by the Lego Corporation.
8 Three-Dimensional CAD drawing depicting the head section of an action figure, such as manufactured by the Lego Corporation.
9 Three-Dimensional CAD drawing depicting the lower torso section that connects the legs of an action figure, such as manufactured by the Lego Corporation.
120 Three-Dimensional CAD drawing depicting a fully assembled action figure, such as manufactured by the Lego Corporation.

FIG. 2:
10 Three-Dimensional CAD drawing depicting the head section of a modified "Lego like" action figure shown with unexcited facial markings that due to lack of contrast render them invisible to the naked eye.
12 Three-Dimensional CAD drawing depicting the stationary marking of the right eye on the head of a modified "Lego like" action figure.
14 Three-Dimensional CAD drawing depicting the stationary marking of the left eye on the head of a modified "Lego like" action figure.
16 Three-Dimensional CAD drawing depicting the stationary marking of a mouth on the head of a modified "Lego like" action figure.
18 Three-Dimensional CAD drawing depicting the upper marking of a mouth part on the head of a modified "Lego like" action figure that is shown in its unexcited state, where the lack of contrast renders it invisible to the naked eye.
20 Three-Dimensional CAD drawing depicting the lower marking of a mouth part on the head of a modified "Lego like" action figure that is shown in its unexcited state, where the lack of contrast renders it invisible to the naked eye.
22 Three-Dimensional CAD drawing depicting the head section of a modified "Lego like" action figure shown with excited facial markings that due to increased contrast render them easily visible to the naked eye.
24 Three-Dimensional CAD drawing depicting the upper marking of a mouth part on the head of a modified "Lego like" action figure that is shown in its excited state, where the increase of contrast renders it easily visible to the naked eye.
26 Three-Dimensional CAD drawing depicting the lower marking of a mouth part on the head of a modified "Lego like" action figure that is shown in its excited state, where the increase of contrast renders it easily visible to the naked eye.

FIG. 3:
- 16 Three-Dimensional CAD cutaway drawing depicting the stationary marking of a mouth on the head of a modified "Lego like" action figure.
- 18 Three-Dimensional CAD cutaway drawing depicting the upper marking of a mouth part on the head of a modified "Lego like" action figure that is shown in its unexcited state, where the lack of contrast renders it invisible to the naked eye.
- 20 Three-Dimensional CAD cutaway drawing depicting the lower marking of a mouth part on the head of a modified "Lego like" action figure that is shown in its unexcited state, where the lack of contrast renders it invisible to the naked eye.
- 22 Three-Dimensional CAD cutaway drawing depicting the head section of a modified "Lego like" action figure shown with excited facial markings that due to increased contrast render them easily visible to the naked eye.
- 24 Three-Dimensional CAD cutaway drawing depicting the upper marking of a mouth part on the head of a modified "Lego like" action figure that is shown in its excited state, where the increase of contrast renders it easily visible to the naked eye.
- 26 Three-Dimensional CAD cutaway drawing depicting the lower marking of a mouth part on the head of a modified "Lego like" action figure that is shown in its excited state, where the increase of contrast renders it easily visible to the naked eye.
- 32 Three-Dimensional CAD drawing depicting the cutaway head section detailing the small aperture within the torso section to allow the light emitted from the surface mount LED to pass through.
- 34 Three-Dimensional CAD drawing depicting the cutaway head section detailing the surface mount LED.
- 36 Three-Dimensional CAD drawing depicting the cutaway head section detailing the pc board that contains the electronics and the surface mount LED.
- 38 Three-Dimensional CAD drawing depicting the cutaway head section detailing the surface mount LED shown emitting light because power has been applied to the LED.

FIG. 4:
- 100 Three-Dimensional CAD drawing depicting a household power cord with the intention that it must be plugged into a wall outlet for operation.
- 120 Three-Dimensional CAD drawing depicting a fully assembled action figure, such as manufactured by the Lego Corporation.
- 130 Three-Dimensional CAD drawing depicting a small charging station for use in wirelessly recharging the power source in a small modified action figure.

FIG. 5:
- 100 Three-Dimensional CAD drawing depicting a household power cord with the intention that it must be plugged into a wall outlet for operation.
- 120 Three-Dimensional CAD drawing depicting a fully assembled action figure, such as manufactured by the Lego Corporation.
- 130 Three-Dimensional CAD drawing depicting a small charging station for use in wirelessly recharging the power source in a small modified action figure.

FIG. 6:
- 100 Three-Dimensional CAD drawing depicting a household power cord with the intention that it must be plugged into a wall outlet for operation.
- 120 Three-Dimensional CAD drawing depicting a fully assembled action figure, such as manufactured by the Lego Corporation.
- 130 Three-Dimensional CAD drawing depicting a small charging station for use in wirelessly recharging the power source in a small modified action figure.
- 140 Three-Dimensional CAD cutaway drawing depicting an inner charging coil used inside the small charging station for use in wirelessly recharging the power source in a small modified action figure.

Figure 7:
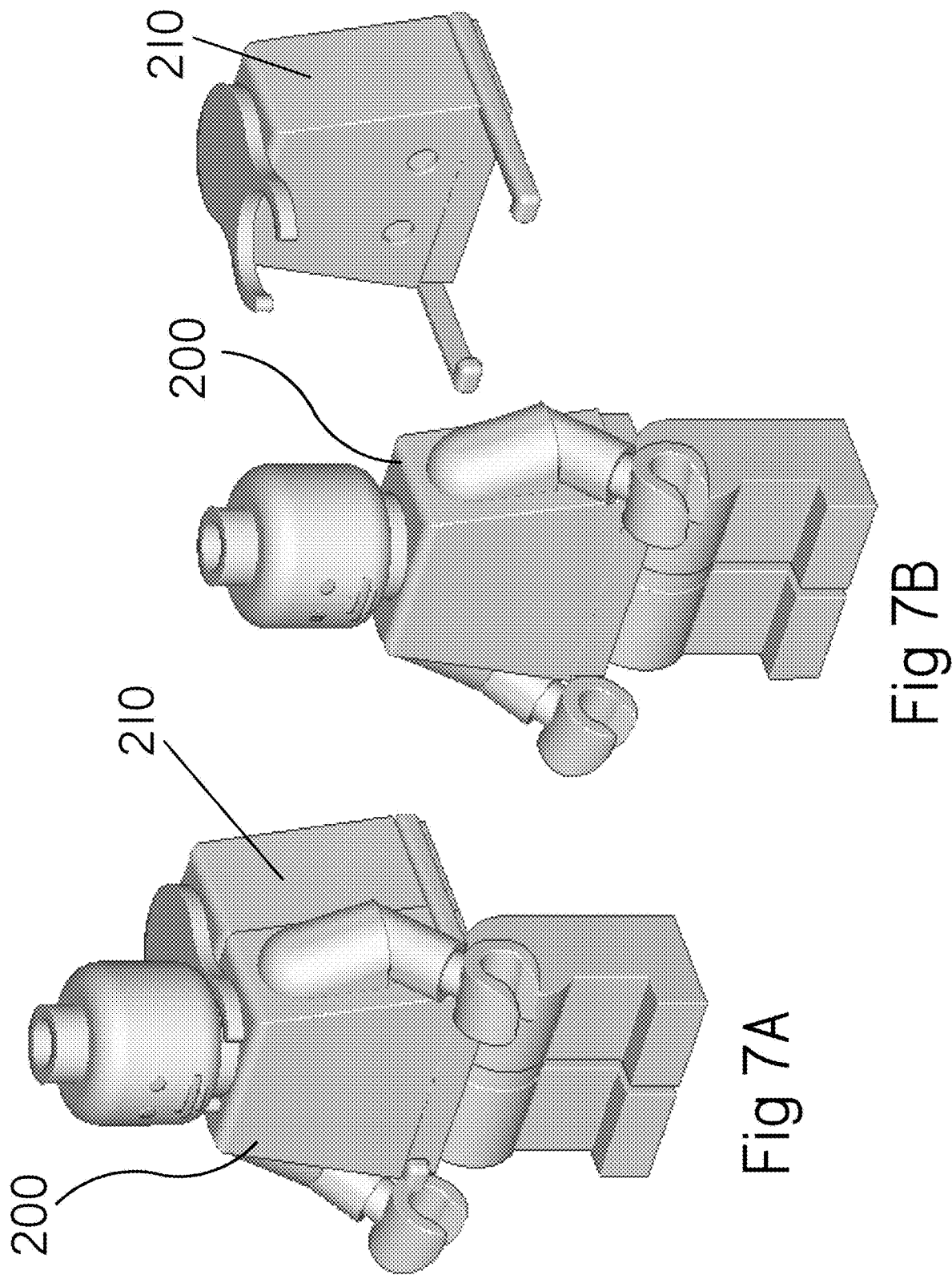
FIG. 7A is a perspective view of a modified action figure with a removable electronics backpack.
FIG. 7B is a perspective view of a modified action figure with the removable electronics backpack shown removed.

FIG. 7:
- 200 Three-Dimensional CAD drawing depicting a fully assembled, modified action figure.
- 210 Three-Dimensional CAD drawing depicting a fully assembled, removable electronics equipped back pack shown unattached from the modified action figure.
- 220 Three-Dimensional CAD drawing depicting a fully assembled, removable electronics equipped back pack shown attached to the modified action figure.

FIG. 8:
- 200 Three-Dimensional CAD drawing depicting a fully assembled, modified action figure.
- 210 Three-Dimensional CAD drawing depicting a fully assembled, removable electronics equipped back pack shown unattached from the modified action figure.
- 230 Three-Dimensional CAD drawing depicting one of several electrically conductive contacts embedded within the modified action figure.
- 240 Three-Dimensional CAD drawing depicting one of several electrically conductive contacts embedded within the modified action figure.
- 250 Three-Dimensional CAD drawing depicting one of several electrically conductive contacts embedded within the removable, electronics equipped back pack.
- 260 Three-Dimensional CAD drawing depicting one of several electrically conductive contacts embedded within the removable, electronics equipped back pack.
- 270 Three-Dimensional CAD drawing depicting one of two torso clips that are used to affix the removable electronics equipped back pack to a modified action figure.
- 280 Three-Dimensional CAD drawing depicting one of two torso clips that are used to affix the removable electronics equipped back pack to a modified action figure.
- 290 Three-Dimensional CAD drawing depicting a clip that is used to affix the removable electronics equipped back pack to a modified action figures head.

FIG. 9:
- 250 Three-Dimensional CAD drawing depicting one of several electrically conductive contacts embedded within the removable, electronics equipped back pack.
- 260 Three-Dimensional CAD drawing depicting one of several electrically conductive contacts embedded within the removable, electronics equipped back pack.
- 270 Three-Dimensional CAD drawing depicting one of two torso clips that are used to affix the removable electronics equipped back pack to a modified action figure.
- 280 Three-Dimensional CAD drawing depicting one of two torso clips that are used to affix the removable electronics equipped back pack to a modified action figure.
- 290 Three-Dimensional CAD drawing depicting a clips that is used to affix the removable electronics equipped back pack to a modified action figures head.

300 Three-Dimensional CAD drawing depicting one of several holes within the removable electronics equipped back pack.
310 Three-Dimensional CAD drawing depicting one of several holes within the removable electronics equipped back pack.
320 Three-Dimensional CAD drawing depicting a hole within the removable electronics equipped back pack to hold the head support.
330 Three-Dimensional CAD drawing electronic components located on the pc board within the removable electronics equipped back pack.
340 Three-Dimensional CAD drawing the pc board used to mount the electronic components within the removable electronics equipped back pack.

FIG. 10:
400 Three-Dimensional CAD drawing depicting a modified action figure shown with the removable electronics equipped back pack with a specific orientation in three-dimensional space.
405 Drawing depicting the physical orientation of a modified action figures specific orientation in three-dimensional space.
410 Three-Dimensional CAD drawing depicting a modified action figure shown with the removable electronics equipped back pack with a specific orientation in three-dimensional space.
415 Drawing depicting the physical orientation of a modified action figures specific orientation in three-dimensional space.

FIG. 11:
500 Three-Dimensional CAD drawing depicting a modified action figure shown with the removable electronics equipped back pack with a specific orientation in three-dimensional space.
505 Drawing depicting wireless communication transmitted from the modified action figures removable, electronics equipped back pack.
510 Drawing depicting wireless communication transmitted from the wireless game controller interface that is physically connected to the game console.
520 Drawing depicting a wireless game controller interface that is physically connected to the game console.
525 Drawing depicting a physical connection between the wireless game controller interface and the game console.
530 Drawing depicting a game console, such as an XBOX, Nintendo, or PlayStation.
535 Drawing depicting a physical connection between the game console and the television.
540 Drawing depicting a television that is used to display the game.

FIG. 12:
600 Schematic drawing depicting a connection that would be physically connected to a game consoles input that responds to the D-packs "UP" button.
605 Schematic drawing depicting a connection that would be physically connected to a game consoles input that responds to the D-packs "LEFT" button.
610 Schematic drawing depicting a connection that would be physically connected to a game consoles input that responds to the D-packs "DOWN" button.
615 Schematic drawing depicting a connection that would be physically connected to a game consoles input that responds to the D-packs "RIGHT" button.
620 Schematic drawing depicting a connection that would be physically connected to a game consoles common input for the four D-pack switches.
625 Schematic drawing depicting a physical switch on a handheld game controllers D-packs "UP" button.
630 Schematic drawing depicting a physical switch on a handheld game controllers D-packs "RIGHT" button.
635 Schematic drawing depicting a physical switch on a handheld game controllers D-packs "LEFT" button.
640 Schematic drawing depicting a physical switch on a handheld game controllers D-packs "DOWN" button.

FIG. 13:
700 Schematic drawing depicting a connection that would be physically connected to a game consoles input that responds to the D-packs "UP" button.
705 Schematic drawing depicting a connection that would be physically connected to a game consoles input that responds to the D-packs "LEFT" button.
710 Schematic drawing depicting a connection that would be physically connected to a game consoles input that responds to the D-packs "DOWN" button.
715 Schematic drawing depicting a connection that would be physically connected to a game consoles input that responds to the D-packs "RIGHT" button.
720 Schematic drawing depicting a connection that would be physically connected to a game consoles common input for the four D-pack switches.
725 Schematic drawing depicting a connection to a transistors base to emulate a physical switch on a handheld game controllers D-packs "UP" button.
730 Schematic drawing depicting a connection to a transistors base to emulate a physical switch on a handheld game controllers D-packs "RIGHT" button.
735 Schematic drawing depicting a connection to a transistors base to emulate a physical switch on a handheld game controllers D-packs "LEFT" button.
740 Schematic drawing depicting a connection to a transistors base to emulate a physical switch on a handheld game controllers D-packs "DOWN" button.

FIG. 14:
800 Schematic drawing depicting a power connection that would be physically connected to a game consoles X-Axis and Y-Axis power.
805 Schematic drawing depicting a connection that would be physically connected to a game consoles input that responds to a handheld controllers joystick X-Axis output.
810 Schematic drawing depicting a connection that would be physically connected to a game consoles input that responds to a handheld controllers joystick Y-Axis output.
815 Schematic drawing depicting a common connection that would be physically connected to a game consoles X-Axis and Y-Axis common or ground.
820 Schematic drawing depicting a potentiometer that produces the X-Axis output.
825 Schematic drawing depicting a potentiometer that produces the Y-Axis output.

FIG. 15:
905 Schematic drawing depicting a connection that would be physically connected to a game consoles input that responds to a handheld controllers joystick X-Axis output.
910 Schematic drawing depicting a connection that would be physically connected to a game consoles input that responds to a handheld controllers joystick Y-Axis output.

915 Schematic drawing depicting a common connection that would be physically connected to a game consoles X-Axis and Y-Axis common or ground.

920 Schematic drawing depicting a digital to analog converter that produces the X-Axis output that would be input into the game console.

925 Schematic drawing depicting a digital to analog converter that produces the Y-Axis output that would be input into the game console.

930 Schematic drawing depicting a communications bus that allows bidirectional communication to and from the individual digital to analog converters and the microcontroller.

935 Schematic drawing depicting a microcontroller.

FIG. 16:

1000 Block diagram drawing depicting the subsystems within the microcontroller.

1005 Schematic drawing depicting a resonant coil that will be used to transfer power wirelessly from an external resonant coil.

1010 Block diagram drawing depicting a power supply that converts alternating power from the resonant coil to direct current power for recharging the power source and supplying power to the microcontroller.

1015 Schematic symbol depicting a crystal that will be used for timing functions on the microcontroller.

1020 Schematic symbol for a power source, such as a battery.

1025 Schematic symbol depicting an antenna.

1030 Schematic symbol for a positive power connection

1035 Schematic symbol for a ground connection.

1040 Schematic symbol depicting wireless, rf communication signals.

FIG. 17:

1100 Drawing of a commercially available Star Wars Millennium Falcon toy manufactured by the LEGO Corporation

FIG. 18:

1000 Block diagram drawing depicting the subsystems within the microcontroller.

1010 Block diagram drawing depicting a power supply that regulates power to the microcontroller.

1015 Schematic symbol depicting a crystal that will be used for timing functions on the microcontroller.

1020 Schematic symbol for a power source, such as a battery.

1025 Schematic symbol depicting an antenna.

1030 Schematic symbol for a positive power connection

1035 Schematic symbol for a ground connection.

1040 Schematic symbol depicting wireless, rf communication signals.

1045 Schematic symbol for a normally open switch that is used to help emulate the UP position in a D-pack control that is found on most handheld game controllers.

1050 Schematic symbol for a normally open switch that is used to help emulate the DOWN position in a D-pack control that is found on most handheld game controllers.

1055 Schematic symbol for a normally open switch that is used to help emulate the LEFT position in a D-pack control that is found on most handheld game controllers.

1060 Schematic symbol for a normally open switch that is used to help emulate the RIGHT position in a D-pack control that is found on most handheld game controllers.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A toy figure with a changeable face comprising:
a head;
a facial area located on the head;
a torso attached to the head;
a pair of arms attached to the torso;
a pair of legs attached to the torso;
changeable markings located on the facial area, the changeable markings will change when the changeable markings receive a stimuli, and the light emanating from the changeable markings is reflective and not transmissive.

2. The toy figure of claim 1, wherein the changeable markings comprise photochromic paint.

3. The toy figure of claim 2, wherein the changeable markings are photochromic paint.

4. The toy figure of claim 2, wherein the changeable markings are electronic paint.

5. The toy figure of claim 1, wherein the changeable markings comprise electrochromic paint.

6. The toy figure of claim 1, wherein the changeable markings comprise an LCD.

7. The toy figure of claim 1, further comprising:
one or more ultraviolet LEDS located within the head;
and the one or more ultraviolet LEDs provide the stimuli to the changeable markings.

8. The toy figure of claim 7, wherein the ultraviolet LEDS are organic LEDs.

9. The toy figure of claim 1, wherein the changeable markings comprise electronic paper.

10. The toy figure of claim 1, wherein the changeable markings comprise a mouth, two eyes, two eyebrows, and a nose.

11. The toy figure of claim 1, wherein the stimuli are selected from the group consisting of UV light, electricity, change in temperature, and a digital signal.

12. The toy figure of claim 1, further comprising:
a narrow pc board located in the head;
a surface mount ultraviolet LED mounted on the narrow pc board;
the surface mount ultraviolet LED configured to direct light to an inside surface of the head such that the light will activate and make visible the changeable markings.

13. The toy figure of claim 12, wherein the head is made of a polymer that allows a portion of the specific wavelength of the light from the LED to penetrate through the head.

14. The toy figure of 1, wherein the changeable markings are configured to appear to be moving when receiving an appropriate stimuli.

15. The toy figure of claim 1, wherein the changeable markings are LCDs.

* * * * *